United States Patent
Kato et al.

(10) Patent No.: US 8,559,083 B2
(45) Date of Patent: Oct. 15, 2013

(54) IMAGE FORMING APPARATUS IN WHICH INTERMEDIATE GRADATION REPRODUCIBILITY IS ENHANCED

(75) Inventors: Tomohiro Kato, Okazaki (JP); Naotoshi Kawai, Toyokawa (JP); Tomoyuki Imura, Toyohashi (JP); Eri Kusano, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 381 days.

(21) Appl. No.: 13/074,796

(22) Filed: Mar. 29, 2011

(65) Prior Publication Data

US 2011/0249277 A1  Oct. 13, 2011

(30) Foreign Application Priority Data

Apr. 12, 2010 (JP) ................. 2010-091587

(51) Int. Cl.
   *H04N 1/46* (2006.01)
   *H04N 1/40* (2006.01)
(52) U.S. Cl.
   USPC .......... 358/533; 358/1.9; 358/3.06; 358/3.13; 358/3.14; 358/3.21; 358/3.23; 358/3.24; 358/3.26; 358/534; 358/536
(58) Field of Classification Search
   USPC ................. 358/1.9, 3.06–3.24, 533–536
   See application file for complete search history.

(56) References Cited

U.S. PATENT DOCUMENTS

| | | | | |
|---|---|---|---|---|
| 5,694,224 A | * | 12/1997 | Tai | 358/3.01 |
| 5,766,807 A | * | 6/1998 | Delabastita et al. | 430/6 |
| 5,828,463 A | * | 10/1998 | Delabastita | 358/3.17 |
| 6,118,935 A | * | 9/2000 | Samworth | 358/1.9 |
| 6,731,405 B2 | * | 5/2004 | Samworth | 358/3.06 |
| 7,450,269 B2 | * | 11/2008 | Tai et al. | 358/3.09 |
| 7,508,549 B2 | * | 3/2009 | Tai et al. | 358/3.2 |
| 7,880,932 B2 | * | 2/2011 | Ishii et al. | 358/3.06 |
| 2001/0030769 A1 | * | 10/2001 | Jacobs | 358/429 |
| 2005/0157347 A1 | * | 7/2005 | Dewitte | 358/3.3 |
| 2006/0290731 A1 | * | 12/2006 | Ishii et al. | 347/15 |

FOREIGN PATENT DOCUMENTS

| | | |
|---|---|---|
| JP | 5-161013 | 6/1993 |
| JP | 5-328112 | 12/1993 |
| JP | 2002-10079 | 1/2002 |

(Continued)

OTHER PUBLICATIONS

Decision to Grant Patent mailed Feb. 28, 2012, directed to Japanese Application No. 2010-091587; 6 pages.

*Primary Examiner* — Richard Zhu

(74) *Attorney, Agent, or Firm* — Morrison & Foerster LLP

(57) ABSTRACT

A first screen group and a second screen group are stored in an image forming apparatus. In the first screen group, the first region expands with increasing gradation value based on a first rule. In the second screen group, the first region expands with increasing gradation value based on an independent second rule different from the first rule. A screen selector relocates a first portion and a second portion such that the first portion and the second portion are joined by a second region that is not a toner adhesion control target, when the first portion and the second portion are adjacent as a result of the selection of the screen in each unit region of the input image. The first portion includes the screen included in the first screen group, and the second portion includes the screen included in the second screen group.

30 Claims, 29 Drawing Sheets

(56) References Cited

FOREIGN PATENT DOCUMENTS

| JP | 2002-300388 | 10/2002 |
| JP | 2003-230009 | 8/2003 |
| JP | 2004-179768 | 6/2004 |
| JP | 2006-33643 | 2/2006 |
| JP | 2009-77340 | 4/2009 |

* cited by examiner

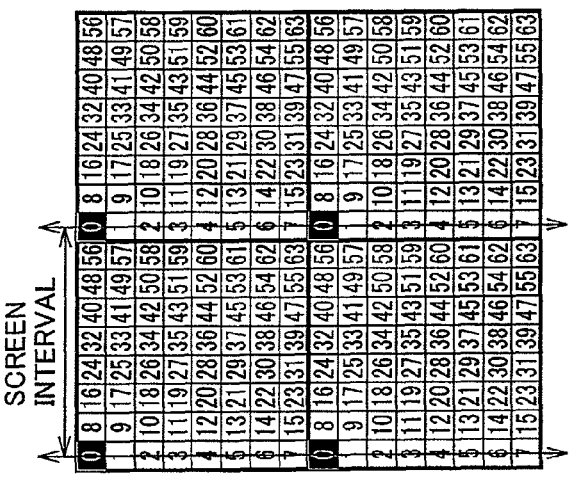
FIG.18C
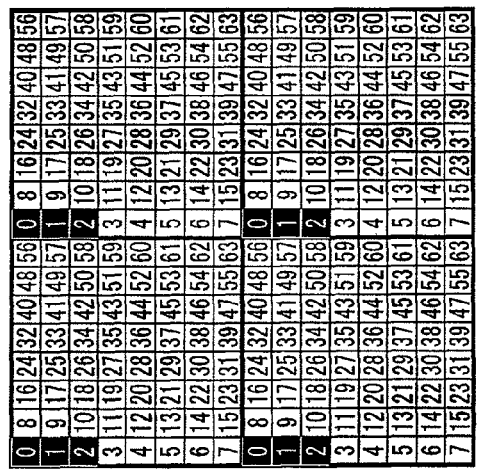
FIG.18B
FIG.18A

SCREEN INTERVAL

FIG.22F 281  270  DELETION TARGET  282

281  271  282A 281  271  283  282A

IMAGE FORMING APPARATUS IN WHICH INTERMEDIATE GRADATION REPRODUCIBILITY IS ENHANCED

This application is based on Japanese Patent Application No. 2010-091587 filed with the Japan Patent Office on Apr. 12, 2010, the entire content of which is hereby incorporated by reference.

BACKGROUND OF THE INVENTION

1. Field of the Invention

The present invention relates to an electrophotographic image forming apparatus, particularly to improvement of a technology of more stably reproducing intermediate gradation.

2. Description of the Related Art

Conventionally, electrophotography is adopted as a process of forming an image on a paper medium in an image forming apparatus such as a copying machine, a printer, a facsimile, and a multifunction peripheral. In the electrophotography, an electrostatic latent image is formed on a photosensitive body (typically, a photosensitive drum or a photosensitive belt) using an exposure device, and the image is formed by developing the electrostatic latent image.

Recently, high resolution of the electrophotography makes progress. For example, the resolution of the electrostatic latent image advances from 600 dpi (dot per inch) to 1200 dpi by improvement of an exposure device. The high resolution of 2400 dpi can be achieved in a high-grade model.

On the other hand, a demand for improving process stability also arises with the improvement of the resolution. Because it is said that the improvement of the resolution is contradictory to the process stability, there is an important technical problem in that the stability is maintained while the resolution is enhanced. The process stability affects the finish of intermediate gradation.

Therefore, for example, Japanese Laid-Open Patent Publication No. 05-161013 discloses a digital recording apparatus that can prevent degradation of image quality caused by an environmental variation, degradation of a density sensor, and degradation of a surface of the photosensitive body and always stably retain the high image quality. Japanese Laid-Open Patent Publication No. 05-328112 discloses a dither process method in which the image having gradation can be restored by performing dither process corresponding to a density state of the image around each pixel constituting a gray scale image even if the target gray scale image has a deviation of the density.

Generally, in the electrophotographic image forming apparatus, the intermediate gradation is reproduced using a halftone technique. In the halftone technique, an objective gradation value is reproduced by controlling a coloring amount (typically, toner adhesion amount) per unit area using a pattern including small dots or lines. In the control of the coloring amount per unit area, plural screens are previously prepared while correlated with plural gradation values, and the screen is selected according to the density to be reproduced. In the general screen, "adhesion regions" that should be colored and "non-adhesion regions" that should not be colored are regularly disposed at a predetermined period. An interval between the "adhesion region" and the "non-adhesion region" can be shortened in the screen with increasing resolution. However, because the process stability can be degraded as described above, there is a restriction to the shortening of the interval between the "adhesion region" and the "non-adhesion region". As a result, although the electrostatic latent image having the high resolution can be formed, the electrostatic latent image having the high resolution is applied only to a character region, and the screen similar to that of the conventional image forming apparatus having the low resolution is used in the intermediate gradation region.

SUMMARY OF THE INVENTION

In order to solve the problem, an object of the invention is to provide an image forming apparatus that maintains the process stability, reproduces the intermediate gradation with the higher resolution, and eliminate the image problem such as the pseudo-contour).

In accordance with an aspect of the invention, an electrophotographic image forming apparatus that selects a screen from a plurality of screens corresponding to a plurality of gradation values to form a toner image on media, each of the plurality of screens including a pattern in which a first region and a second region are defined, the first region including a pixel that is a toner adhesion control target, the second region including a pixel that is not the toner adhesion control target, includes: a storage unit for storing a first screen group and a second screen group, the first region expanding with increasing gradation value based on a first rule in the first screen group, the first region expanding with increasing gradation value based on an independent second rule different from the first rule in the second screen group; a screen selector for selecting the screen from the first screen group when the gradation value is smaller than a first threshold with respect to a unit region of an input image and selecting the screen from the second screen group when the gradation value is larger than the first threshold; and an image producing unit for performing image formation using the selected screen, wherein the screen selector relocates a first portion and a second portion such that the first portion and the second portion are joined by the second region that is not the toner adhesion control target, the first portion including the screen included in the first screen group, the second portion including the screen included in the second screen group, when the first portion and the second portion are adjacent to each other as a result of the selection of the screen in each unit region of the input image.

Preferably the first screen group includes a pattern having a gradation value that is relatively larger than that of a pattern included the second screen group to have an identical area ratio, the area ratio being a ratio of an area occupied by the first region in the unit region, when the area ratio is relatively low.

Preferably the first screen group includes a dot pattern, and the second screen group includes a line pattern.

Preferably the second region is relocated so as to have a predetermined width in a joining portion that joins the first portion and the second portion.

Preferably the screen of the first screen group constituting the first portion is a dot pattern, and the predetermined width is an interval between dots near the joining portion that joins the first portion and the second portion.

Preferably the screen selector is operative to relocate the first region while maintaining an area of the first region in the unit region.

Preferably the screen selector is operative to relocate the first portion and the second portion such that the first portion and the second portion are joined by the second region when a parallel component does not exist in a gradation-change direction and a screen-angle direction of the screen constituting the first portion and the second portion.

Preferably the first rule includes expansion of a dot diameter or an increase in the number of dots with increasing gradation value, and the second rule includes expansion of a line width or an increase in the number of disposed lines with increasing gradation value.

Preferably the storage unit in which a third screen group is further stored, the second region decreasing with decreasing gradation value based on an independent third rule different from the first and second rules in the third screen group, and the screen selector is operative to select the screen from the third screen group when the gradation value is larger than a second threshold that is larger than the first threshold with respect to the unit region of the input image.

More preferably the third screen group includes an open dot pattern. More preferably the screen selector relocates the first portion and the second portion such that the first portion and the second portion are joined by the second region when the first portion includes the screen having the dot pattern while the second portion includes the screen having the line pattern, and the screen selector does not relocate the first portion and the second portion such that the first portion and the second portion are joined by the second region when the first portion includes the screen having the line pattern while the second portion includes the screen having the open dot pattern.

Preferably each screen constituting the plurality of screens includes a pattern having a common screen angle and the common number of screen lines.

Preferably an area ratio of the second screen group is larger than that of the first screen group at a gradation value of the first threshold with respect to the area ratio that is of a ratio of an area occupied by the first region in the unit region.

Preferably the image forming apparatus further includes: a density sensor for detecting density as a result of image formation of the image producing unit; and a producing unit for producing or updating the plurality of screens based on detection result of the density sensor.

More preferably the producing unit is operative to obtain a gradation characteristic of the first screen group from the result of the density sensor that detects the image formation result with each screen included in the first screen group according to a reference pattern having a plurality of different gradation values, obtain a gradation characteristic of the second screen group from the result of the density sensor that detects the image formation result with each screen included in the second screen group according to the reference pattern, and determine the first threshold such that an error of a gradation characteristic corresponding to the reference pattern is reduced based on the gradation characteristics of the first and second screen groups.

Preferably the image forming apparatus further includes an update unit for updating the plurality of screens stored in the storage unit according to an image producing condition of the image forming apparatus.

In accordance with another aspect of the invention, an electrophotographic image forming apparatus that selects a screen from a plurality of screens corresponding to a plurality of gradation values to form a toner image on media, includes: a storage unit in which a first screen group and a second screen group are stored, the first screen group including a plurality of screens having a first pattern, the first pattern defining a first region including a pixel that is a toner adhesion control target, the second screen group including a plurality of screens having a second pattern, the second pattern defining a second region including a pixel that is not the toner adhesion control target; a screen selector for selecting the screen from the first screen group such that the first region expands in a predetermined direction with increasing gradation value, switching the selected screen from the first screen group to the second screen group when the gradation value reaches a predetermined threshold, and selecting the screen, in which a width of the second region in the second pattern is larger than a distance between the adjacent first regions in the first pattern in the predetermined direction, as the screen during switching; and an image producing unit for performing image formation using the selected screen, wherein the screen selector relocates a first portion and a second portion such that the first portion and the second portion are joined by the second region that is not the toner adhesion control target, the first portion including the screen included in the first screen group, the second portion including the screen included in the second screen group, when the first portion and the second portion are adjacent to each other as a result of the selection of the screen in each unit region of the input image.

In accordance with still another aspect of the invention, an electrophotographic image forming apparatus that selects a screen from a plurality of screens corresponding to a plurality of gradation values to form a toner image on media, includes: a storage unit in which a first screen group and a second screen group are stored, the first screen group including a plurality of screens having a first pattern, the first pattern defining a first region including a pixel that is a toner adhesion control target, the second screen group including a plurality of screens having a second pattern, the second pattern defining a second region including a pixel that is not the toner adhesion control target; a screen selector for selecting the screen from the second screen group such that the second region expands in a predetermined direction with decreasing gradation value, switching the selected screen from the second screen group to the first screen group when the gradation value reaches a predetermined threshold, and selecting the screen, in which a distance between the adjacent first regions in the first pattern is smaller than a width of the second region in the second pattern in the predetermined direction, as the screen during switching; and an image producing unit for performing image formation using the selected screen, wherein the screen selector relocates a first portion and a second portion such that the first portion and the second portion are joined by the second region that is not the toner adhesion control target, the first portion including the screen included in the first screen group, the second portion including the screen included in the second screen group, when the first portion and the second portion are adjacent to each other as a result of the selection of the screen in each unit region of the input image.

Preferably the screen selected from the first screen group and the screen selected from the second screen group have a substantially identical gradation value before and after the switching.

Preferably the screen selector performs relocation, in which the pixel of the toner adhesion control target in the first region is replaced with the pixel that is not the toner adhesion control target in the second region, while the identical gradation value is maintained before and after the switching.

Preferably the first screen group includes a dot pattern, and the second screen group includes a line pattern.

Preferably the second region is relocated so as to have a predetermined width in a joining portion that joins the first portion and the second portion.

More preferably the screen of the first screen group constituting the first portion is a dot pattern, and the predetermined width is an interval between dots near the joining portion that joins the first portion and the second portion.

Preferably the screen selector is operative to relocate the first region while maintaining an area of the first region in the unit region.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 17A to 17F illustrate examples of a pattern change that emerges on the dot screen.

Figures 18D, 18E, 18F:
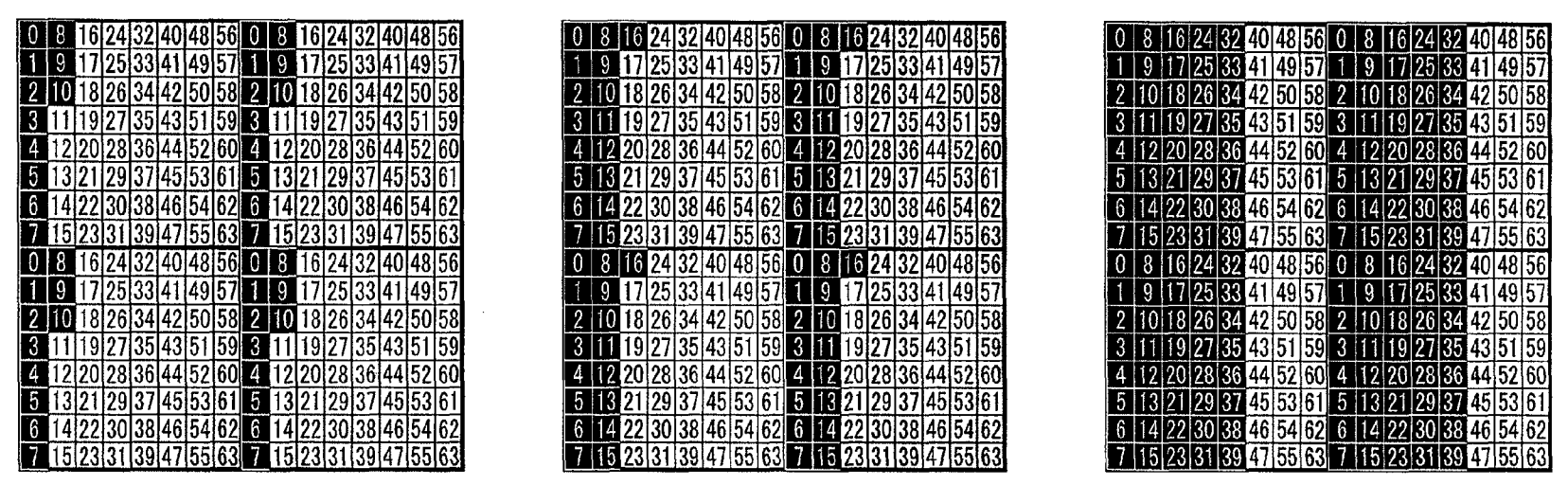

FIGS. 18A to 18F illustrate examples of a pattern change that emerges on the line screen.

Figures 19A, 19B, 19C:
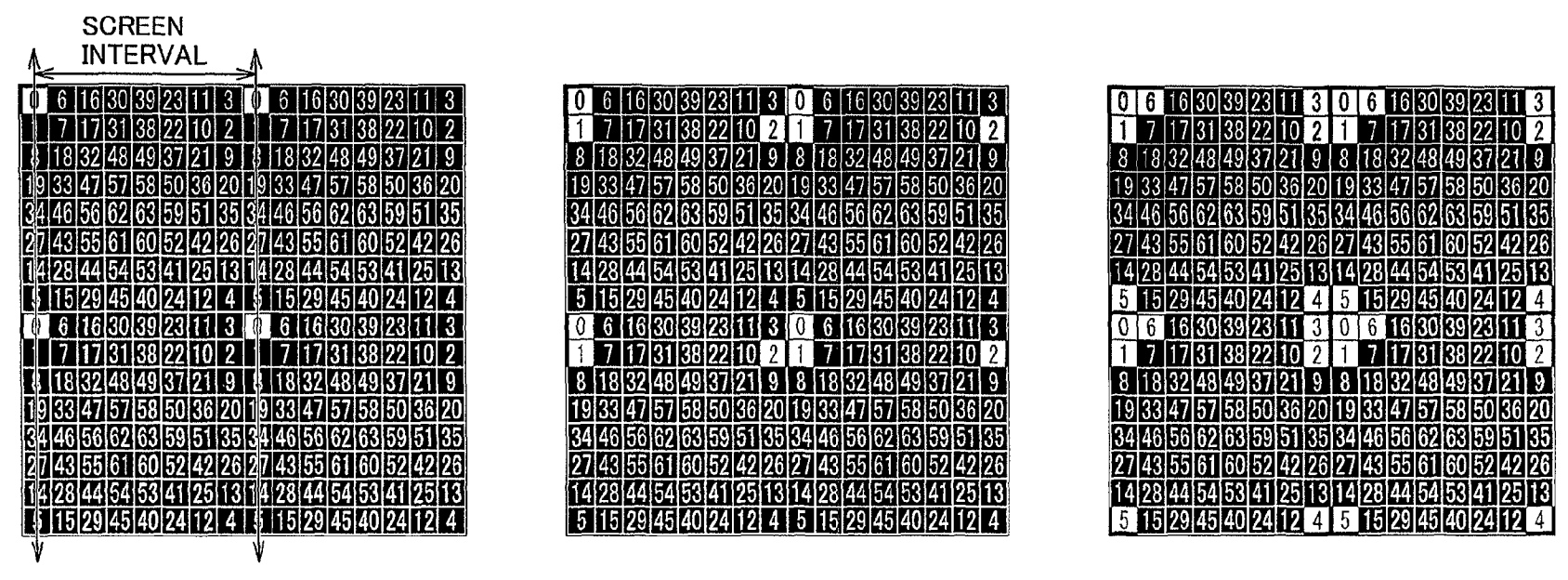
Figures 19D, 19E, 19F:
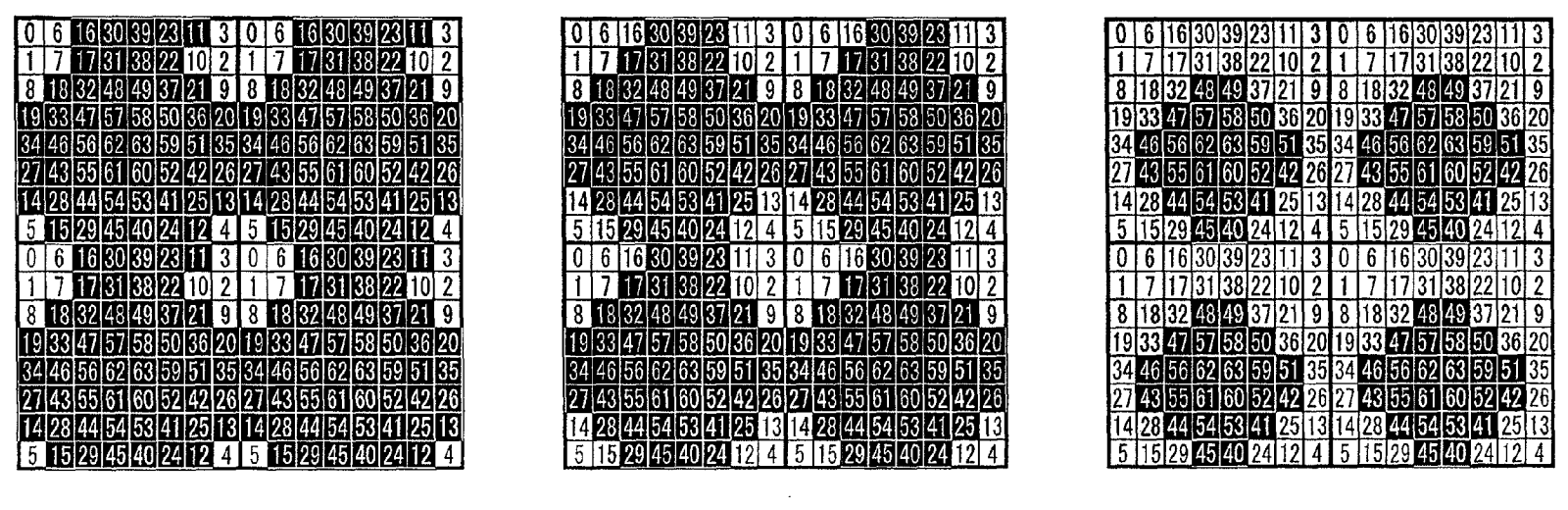

FIGS. 19A to 19F illustrate examples of a pattern change that emerges on the open dot screen.

Figures 20A, 20B, 20C:
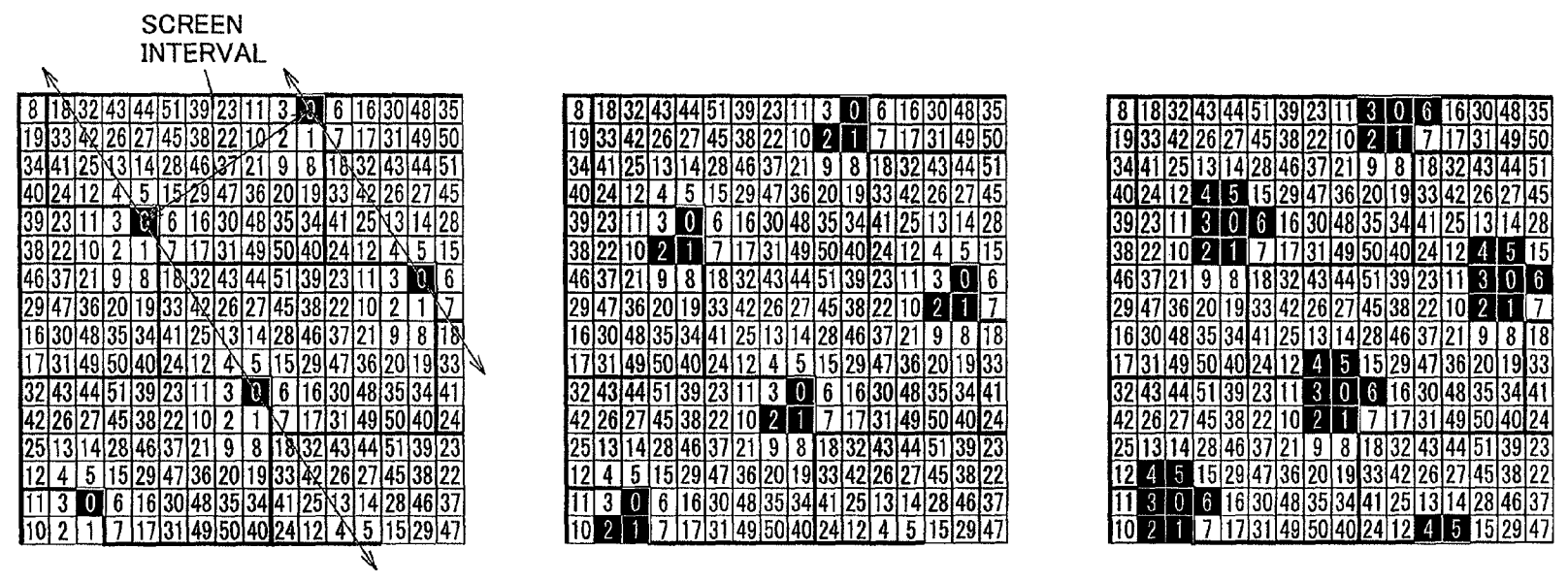
Figures 20D, 20E, 20F:
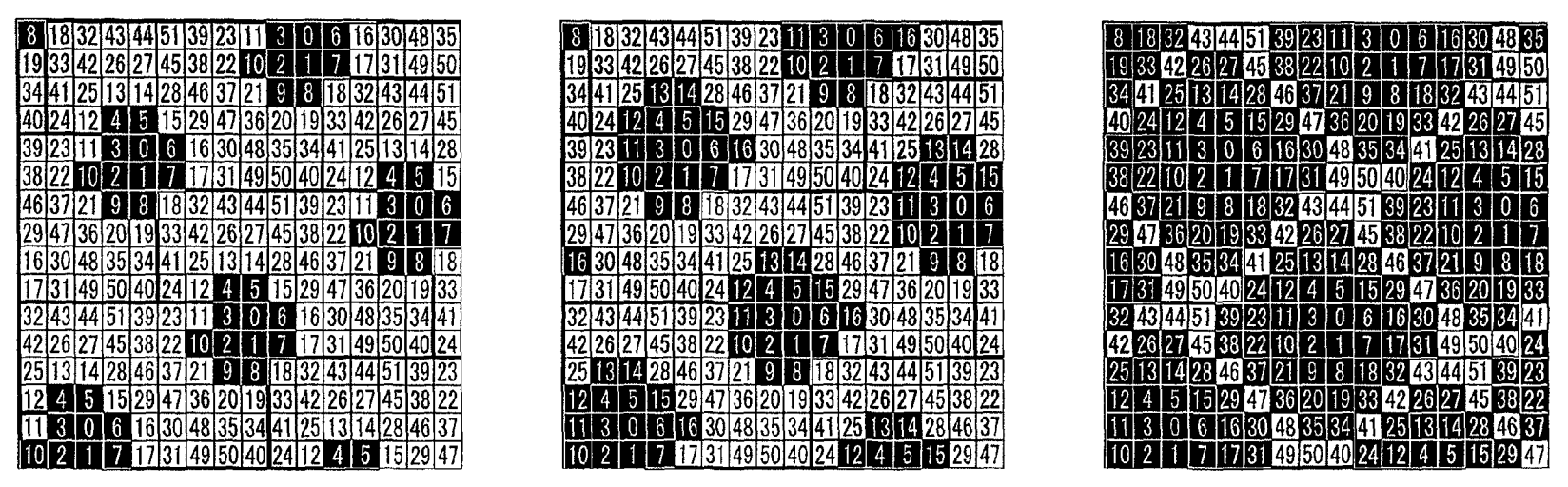

FIGS. 20A to 20F illustrate other examples of the pattern change that emerges on the dot screen.

Figures 21A, 21B, 21C:
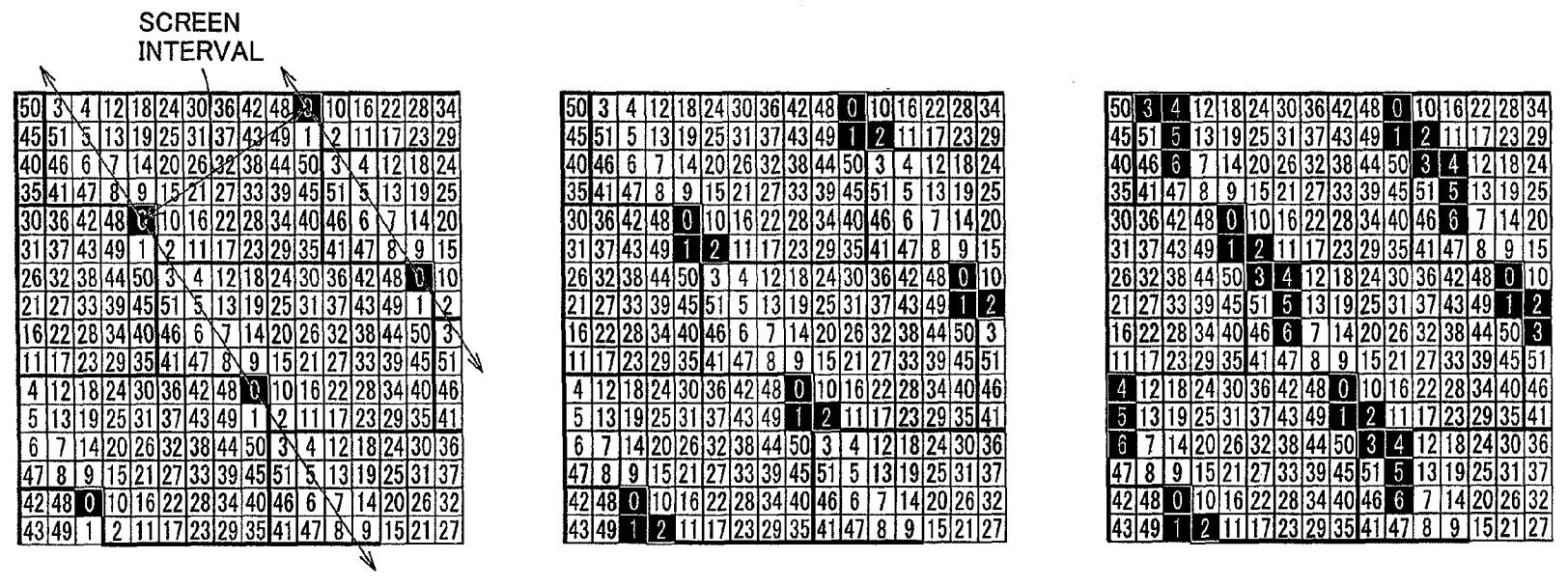
Figures 21D, 21E, 21F:
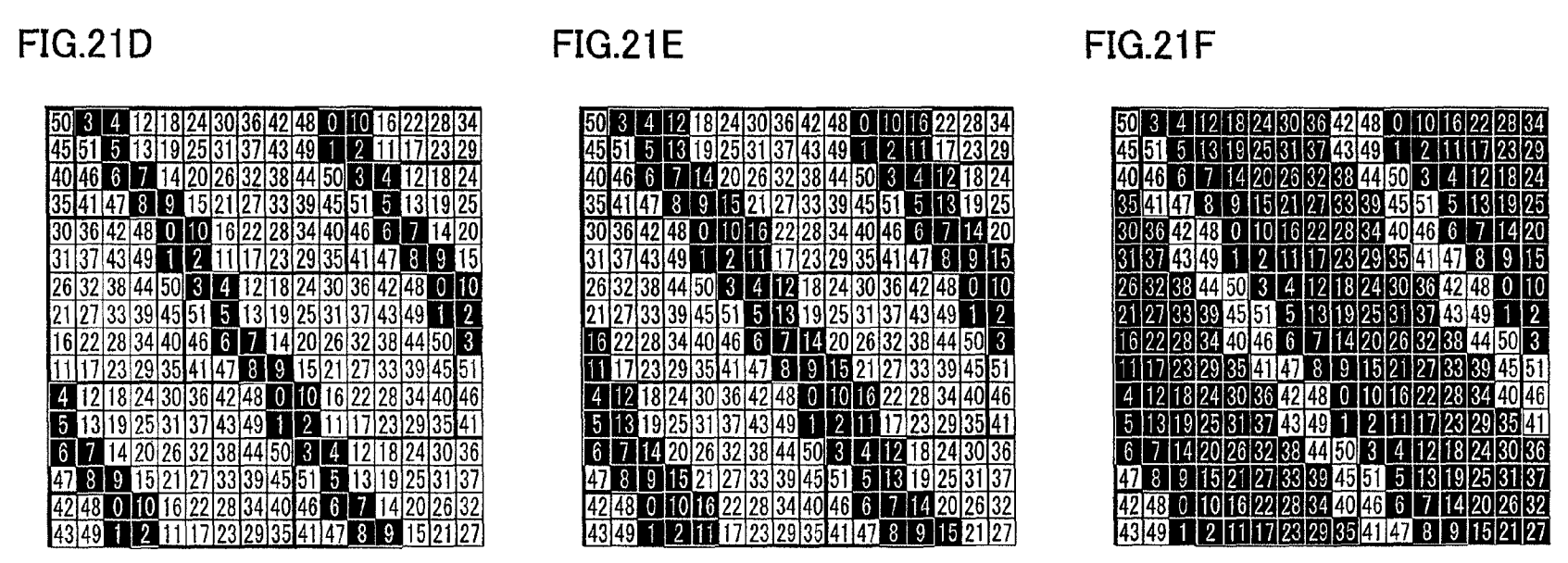

FIGS. 21A to 21F illustrate other examples of the pattern change that emerges on the line screen.

Figures 22A, 22B, 22C:
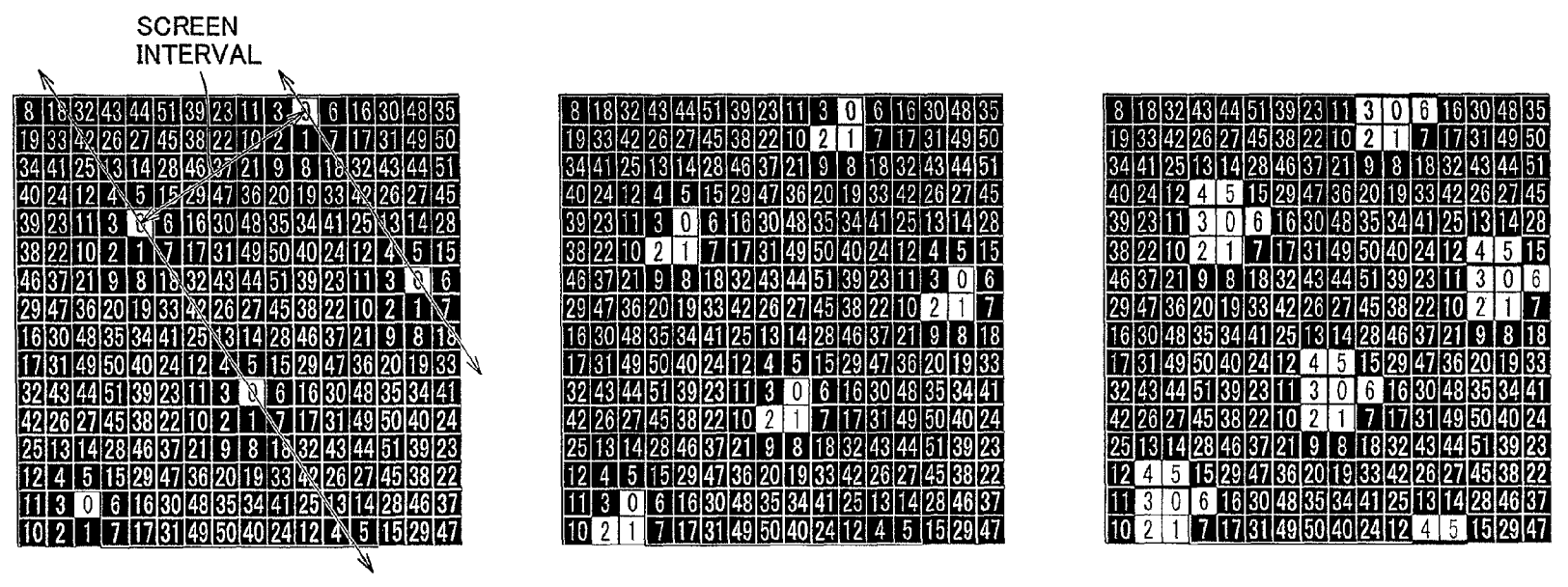
Figures 22D, 22E, 22F:
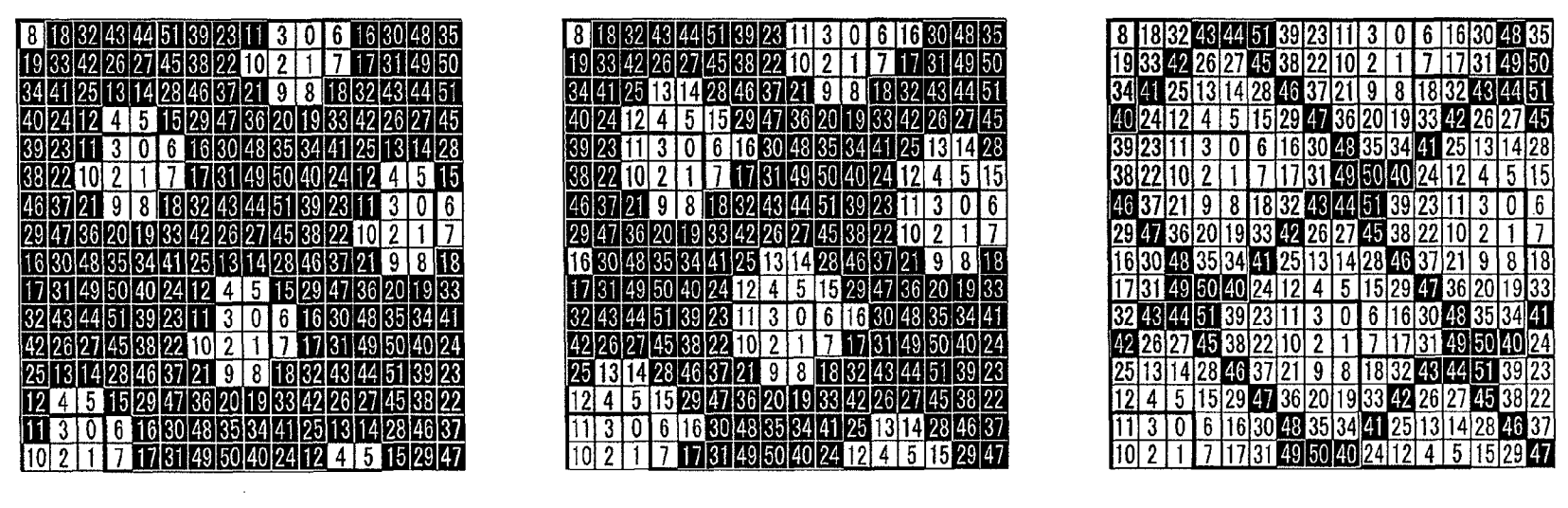

FIGS. 22A to 22F illustrate other examples of the pattern change that emerges on the open dot screen.

DESCRIPTION OF THE PREFERRED EMBODIMENTS

Figure 1:
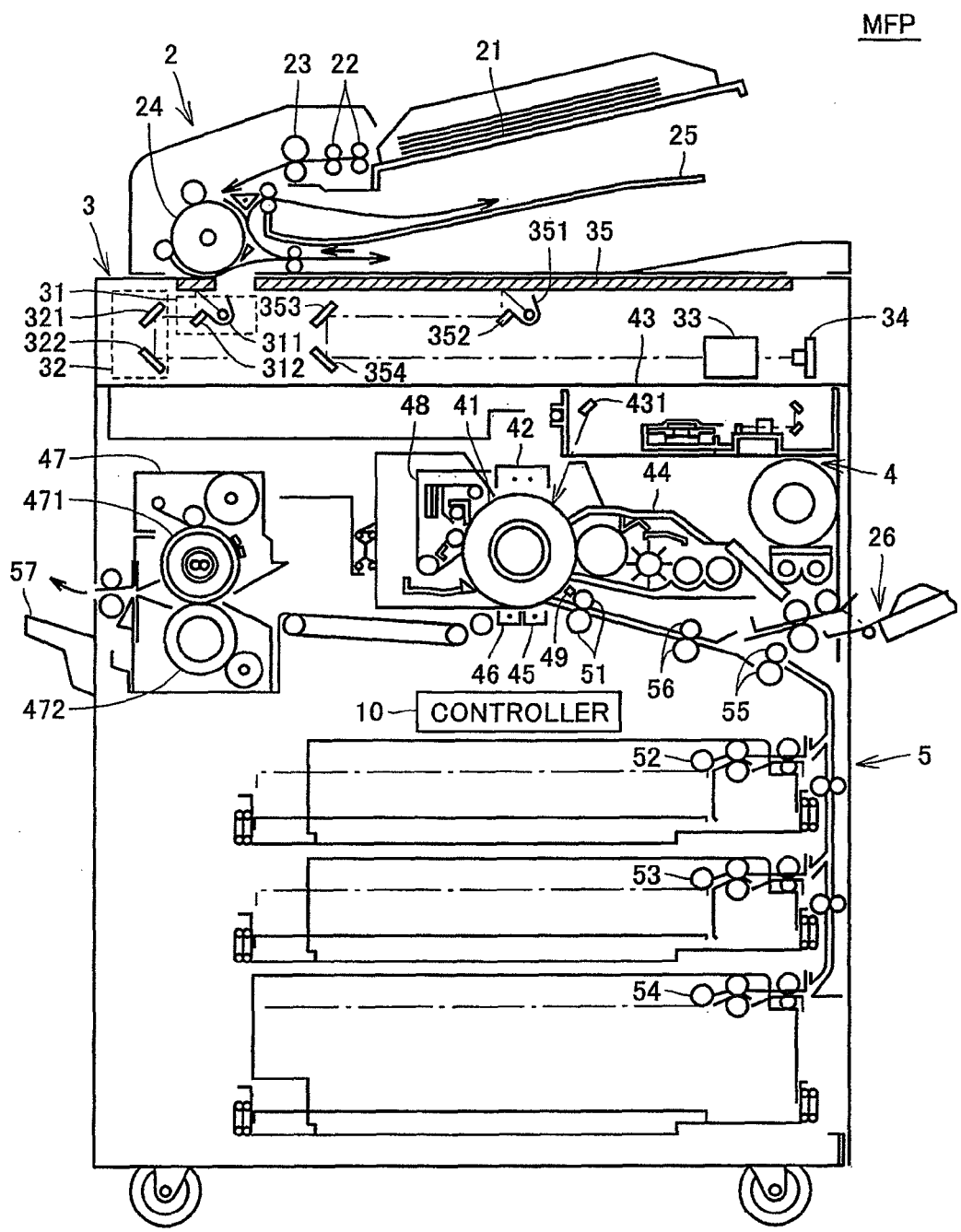
FIG. 1 illustrates a schematic configuration of an image forming apparatus according to an embodiment of the invention.

An exemplary embodiment of the invention will be described with reference to the drawings. In the drawings, identical or equivalent constituents are designated by an identical numeral, and the description is not repeated.

Configuration of Image Forming Apparatus

The invention can be applied to any electrophotographic image forming apparatus. Specifically, for example, the invention is applied to a copying machine, a laser printer, a facsimile, and a multi function peripheral. A multi function peripheral that is equipped with plural functions such as a copying function, a print function, a facsimile function, and a scanner function will be described below as a typical example of an image forming apparatus according to an embodiment of the invention.

FIG. 1 illustrates a schematic configuration of an image forming apparatus MFP according to an embodiment of the invention. Referring to FIG. 1, image forming apparatus MFP includes an automatic document conveying unit 2, a scanner 3, a print engine 4, and a sheet feeder 5.

Automatic document conveying unit 2 continuously scans a document, and automatic document conveying unit 2 includes a document feed rack 21, a delivery roller 22, a registration roller 23, a conveying drum 24, and a sheet discharge rack 25. The document of a scan target is placed on document feed rack 21 and delivers one by one by actuation of delivery roller 22. The delivered document is conveyed to conveying drum 24 after tentatively stopped to align a leading end of the document by registration roller 23. The document rotates while being integral with a drum surface of conveying drum 24, and an image surface is scanned by scanner 3 during the rotation. Then the document is separated from the drum surface in a position where the document goes substantially half around along the surface of conveying drum 24, and the document is discharged to sheet discharge rack 25.

The scanner 3 includes a first mirror unit 31, a second mirror unit 32, an imaging lens 33, an imaging element 34, and a platen glass 35. First mirror unit 31 includes a light source 311 and a mirror 312 to emit light from light source 311 toward the passing document in a position immediately below conveying drum 24. In the light emitted from light source 311, the light reflected from the document is incident to second mirror unit 32. Second mirror unit 32 includes mirrors 321 and 322 that are disposed so as to be orthogonal to a document moving direction. The light reflected from first mirror unit 31 is sequentially reflected by mirrors 321 and 322 and guided to imaging lens 33. Imaging lens 33 images the reflected light onto linear imaging element 34.

In image forming apparatus MFP, the image information can also be obtained from the document placed on platen glass 35. In such cases, a movable light source 351 and a mirror 352 scan the image surface of the document. During the scan, the light emitted from light source 351 is sequentially reflected by mirrors 353 and 354, which are disposed so as to be orthogonal to the document moving direction, and guided to imaging lens 33.

Imaging element 34 converts the received reflected light into an electric signal and outputs the electric signal to a controller 10. Controller 10 performs various pieces of image processing to the image information on the document obtained by scanner 3, that is, the electric signal output from imaging element 34.

Print engine 4 can perform monochrome print output as an example of an electrophotographic image forming process. That is, print engine 4 corresponds to an image producing unit that performs image forming processing. Specifically, print engine 4 includes a photosensitive drum 41, a charger 42, an image writing unit 43, a development unit 44, a transfer device 45, a static eliminator 46, a fixing device 47, a cleaner 48, and an IDC (Image Density Control) sensor 49. When an instruction to start the image forming processing (print processing) is provided by a user operation, image writing unit 43 rotates a polygon mirror (not illustrated) based on image data of a print target, whereby image writing unit 43 irradiates photosensitive drum 41 with a laser beam emitted from a laser emitting device 431 as main-scanning exposure with respect to an axial direction of photosensitive drum 41. At the same time, sub-scan exposure is performed by rotation of photosensitive drum 41. Charger 42 provides a predetermined potential to photosensitive drum 41 before photosensitive drum 41 irradiated with the laser beam. Photosensitive drum 41 is evenly charged by the potential. As to the configuration in which photosensitive drum 41 is charged, a corona discharge method may be adopted instead of the roller charging method of FIG. 1. In the corona discharge method, photosensitive drum 41 is charged using a charger that generates a predetermined potential and a grid mesh, a blade, a brush, and the like that are electrically connected to the charger.

An electrostatic latent image of the document image is formed on a photosensitive layer of photosensitive drum 41 by the main-scanning exposure and the sub-scanning exposure. As to the exposure device, a configuration in which light emission amounts of plural LEDs (Light Emitting Diode) disposed along the axial direction of photosensitive drum 41 are controlled may be adopted instead of a configuration in which the laser beam emitted from laser emitting device 431 is controlled using the polygon mirror. As to the image bearing body, a belt-shaped photosensitive body may be adopted instead of roller-shaped photosensitive drum 41 of FIG. 1.

Development unit 44 performs reversal development of the electrostatic latent image formed on photosensitive drum 41, thereby producing a toner image. For example, development unit 44 produces the toner image in accordance with a two-component development method. That is, two-component developer containing toner and carriers are stored in development unit 44, and the toner and carriers are stirred by a stirring screw to become a triboelectrically-charged developer. The developer is supplied to a development roller by a supply screw. When conveyed to a position close to a development region on photosensitive drum 41 by the rotation of the development roller, the developer moves to photosensitive drum 41 by receiving an electric field generated between a potential at the development roller and a potential at the electrostatic latent image formed on photosensitive drum 41. As a result, the electrostatic latent image on photosensitive drum 41 is developed as the toner image. As to development unit 44, a one-component development method or a hybrid development method may be adopted instead of the two-component development method.

In delivery rollers 52, 53, and 54 and a manually sheet feed unit 26 corresponding to sheet feed cassettes of sheet feeder 5 in which media is stored, the unit corresponding to media that should be used in the image formation is actuated to supply media in parallel with the operation of development unit 44. The supplied media is conveyed by conveying rollers 55 and 56 and a timing roller 51, and media is supplied to photosensitive drum 41 so as to be synchronized with the toner image formed on photosensitive drum 41.

Transfer device 45 applied a voltage having an opposite polarity to photosensitive drum 41 to transfer the toner image formed on photosensitive drum 41 to media. Static eliminator 46 eliminates static electricity of media to which the toner image is transferred, thereby separating media from photosensitive drum 41. Then media to which the toner image is transferred is conveyed to fixing device 47. As to transfer device 45, a transfer method in which a transfer charger or a transfer belt is used may be adopted instead of the transfer method in which the transfer roller of FIG. 1 is used. Alternatively, instead of direct transfer method transferring directly the toner image from photosensitive drum 41 to media, an intermediate transfer body such as a transfer roller and a transfer belt may be disposed between photosensitive drum 41 and media to perform the transfer through at least two processes.

Fixing device 47 includes a heating roller 471 and a pressurizing roller 472. Heating roller 471 heats media to melt the toner transferred onto media, and the melted toner is fixed onto media by a compressive force between heating roller 471 and pressurizing roller 472. Media is discharged to tray 57. As to fixing device 47, a fixing method in which a fixing belt is used or a non-contact fixing method may be adopted instead of the fixing method in which the fixing roller of FIG. 1 is used.

On the other hand, in photosensitive drum 41 from which media is separated, residual toner is removed and cleaned by cleaner 48 after a residual potential is removed. Then next image forming processing is performed. For example, cleaner 48 removes and cleans the residual toner using a cleaning blade, a cleaning brush, a cleaning roller, or a combination thereof. Alternatively, a cleaner-less method for recovering the residual toner with development unit 44 may be adopted instead of cleaner 48.

IDC sensor 49 detects density of the toner image formed on photosensitive drum 41. IDC sensor 49 is typically a light intensity sensor including a reflective photosensor to detect the intensity of the light reflected from the surface of photosensitive drum 41. That is, IDC sensor 49 detects result of the image formation.

Intermediate Gradation Reproducing Processing

Intermediate gradation reproducing processing in the electrophotographic image forming process will be described below. As described above, in the electrophotographic image forming process, the surface of the evenly-charged photosensitive body exposed with the laser beam according to the image that should be reproduced, the electrostatic latent image is formed on the photosensitive body, and the formed electrostatic latent image is developed as the toner imaged by the development unit. That is, in the electrophotography, only whether the toner image should be formed is controlled in the portion on the surface of the photosensitive body, a coloring amount (that is, toner adhesion amount) of the portion cannot continuously be controlled. Therefore, the intermediate gradation in the electrophotography is reproduced by controlling a ratio (hereinafter also referred to as an "area ratio") of an area to which the toner should adhere per unit area using a halftone technique. That is, the intermediate gradation is reproduced by controlling an exposure amount per unit area by the exposure device according to an exposure pattern including a small point or line. Because so-called Pulse Width Modulation (PWM) in which on/off time of the light used in the exposure is controlled is generally adopted in the exposure device, a configuration in which the exposure device of the pulse width modulation is used will be described in the embodiment. In the pulse width modulation, a ratio of light emitting time is relatively shortened with respect to the portion having the low image density (low gradation value), and the ratio of the light emitting time is relatively lengthened with respect to the portion having the high image density (high gradation value).

More specifically, in image forming apparatus MFP according to the embodiment, the intermediate gradation is reproduced using a so-called screen technology. In the screen technology, plural screens are previously prepared while correlated with plural gradation values. The screen is selected from the plural screens in each unit region having the intermediate gradation included in the input image, and the exposure pattern is controlled with respect to the surface of the photosensitive body according to the selected screen. That is, image forming apparatus MFP according to the embodiment selects the screen from the plural screens corresponding to the plural gradation values to form the toner image on media. In order to reproduce a photograph with high accuracy, it is necessary to be able to reproduce many gradation values. Therefore, the screens as many as the gradation values that become objects are previously prepared. Generally a "dot screen" or a "line screen" is adopted as a screen group.

Figure 2:
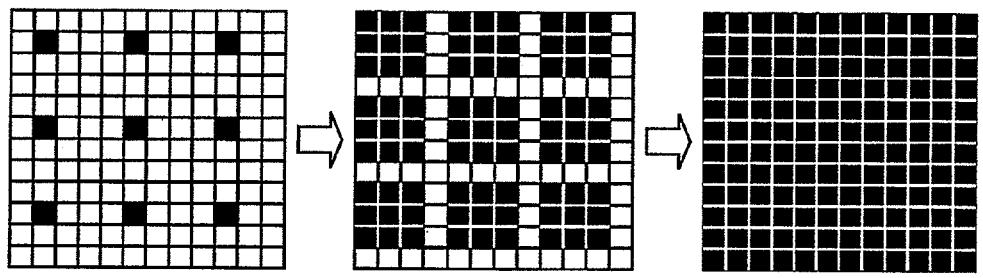
FIGS. 2 and 3 illustrate examples of a layout pattern in a dot screen.
Figure 3:
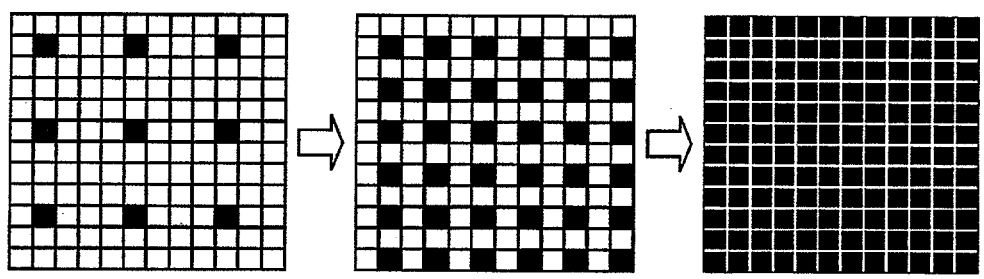
Figure 4:
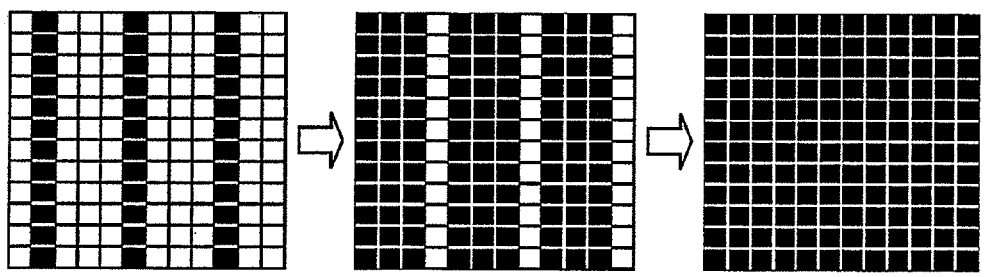
FIGS. 4 and 5 illustrate examples of a layout pattern in a line screen.
Figure 5:
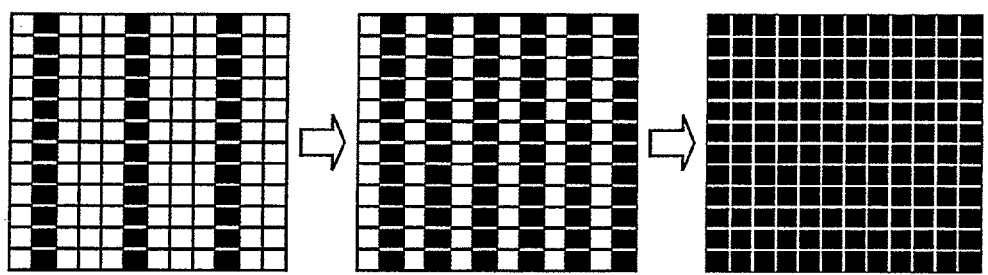

FIGS. 2 and 3 illustrate examples of a layout pattern in the dot screen, and FIGS. 4 and 5 illustrate examples of a layout pattern in the line screen. As illustrated in FIGS. 2 to 5, each screen has a binarized pattern defined by a "first region (toner adhesion region)" and a "second region (toner non-adhesion region)". The "first region (toner adhesion region)" is a region that should be colored (toner should adhere to). The "second region (toner non-adhesion region)" is a region that should not be colored (toner should not adhere to). In FIGS. 2 to 5, the first region (toner adhesion region) is expressed by "black", and the second region (toner non-adhesion region) is expressed by "white". The similar expression method is adopted in the following drawings.

As illustrated in FIGS. 2 to 5, each of the plural screens includes a pattern in which the first region (or toner adhesion region) including pixels that is a toner adhesion control target and the second region (or toner non-adhesion region) including pixels that are not the toner adhesion control target are defined. The "first region" corresponds to a pixel or a pixel aggregate that is a control target in order to cause the toner to adhere, and the "second region" corresponds to a region except the "first region", that is, a pixel or a pixel aggregate that is not the control target in order to cause the toner to adhere.

Hereinafter, the first region (or toner adhesion region) is simply referred to as an "adhesion region", and the second region (or toner non-adhesion region) is simply referred to as a "non-adhesion region".

As illustrated in FIGS. 2 and 3, typically the "dot screen" has the pattern in which the adhesion regions are disposed into a matrix shape while the regions except the adhesion regions are disposed as the non-adhesion region. On the other hand, as illustrated in FIGS. 4 and 5, the "line screen" has the pattern in which the linear adhesion regions and non-adhesion regions extending in a predetermined direction are alternately disposed.

At this point, in order to reproduce the dense image having little granularity (surface roughness) in the print result, preferably a spatial frequency is not largely changed by screen switching. Therefore, when the gradation value of the density reproduced in the dot screen is increased, a method in which other dots are collected by additionally disposing other dots around the original dot as illustrated in FIG. 2 or a method in which the number of disposed dots is increased by dispersing the dots as illustrated in FIG. 3 is adopted. The dot screen has the pattern change in which the adhesion region expands according to a predetermined rule (the expansion of the dot aggregation or the increase in the number of dispersed dots) in association with the increase of the gradation value.

When the gradation value of the density reproduced in the line screen is increased, a method in which a line width of an original line is widened while a center position of the original line is maintained as illustrated in FIG. 4 or a method in which the number of disposed lines is increased by dispersing the lines as illustrated in FIG. 5 is adopted. The line screen has the pattern change in which the adhesion region expands according to a predetermined rule (the expansion of the line width or the increase in the number of disposed lines dispersed) in association with the increase of the gradation value.

Figure 6:
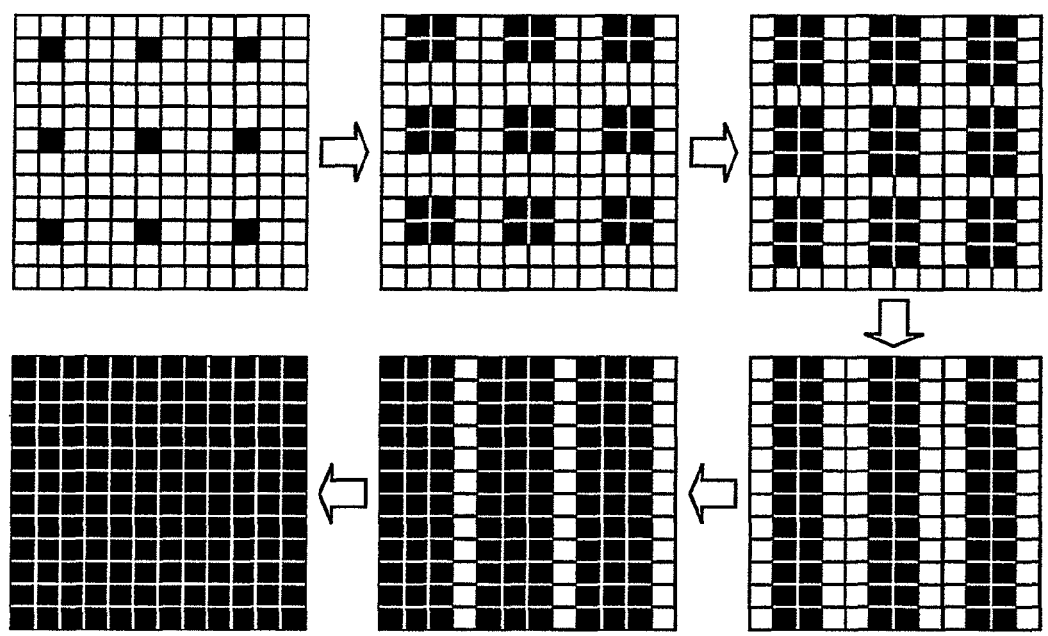
FIGS. 6 and 7 illustrate examples of a layout pattern in a composite screen group of the dot screen and the line screen.
Figure 7:
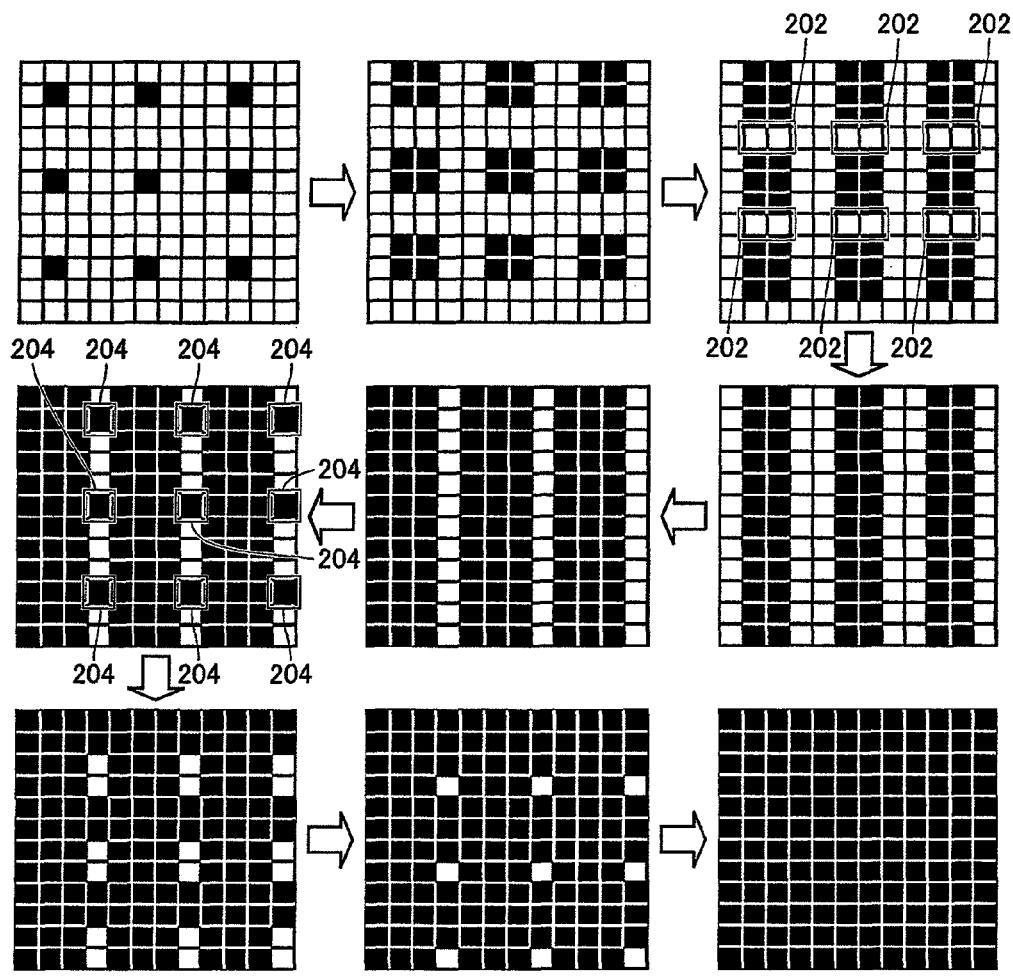

A screen group in which the dot screen and the line screen are composite is occasionally adopted. FIGS. 6 and 7 illustrate examples of a layout pattern in a composite screen group of the dot screen and the line screen.

FIG. 6 illustrates an example of the screen group, in which the pattern change similar to that of the dot screen of FIG. 2 is illustrated on a low gradation side while the pattern change similar to that of the line screen of FIG. 4 is illustrated on a high gradation side. That is, in the screen group of FIG. 6, on the low gradation side, a dot diameter gradually increases with increasing gradation value of the density, and the line width gradually expands with further increasing gradation value after the number of dots exceeds a certain area ratio (that is, after the adjacent dots are joined to each other).

FIG. 7 illustrates a screen group in which gradation reproducibility on the high gradation side is enhanced compared with the screen group of FIG. 6. That is, in the screen group of FIG. 7, when the gradation value that should be reproduced is relatively low, the dot diameter gradually expands with increasing gradation value of the density, and the whole line width gradually increases with further increasing gradation value after the number of dots exceeds a certain area ratio. When the line width exceeds a predetermined value, only the width in part of the line gradually expands.

Image Reproducibility in Electrophotography

As described above, the electrophotography is not good at the reproduction of the extremely thin line of small gap, because the electrostatic latent image is developed into the toner image.

Figure 8:
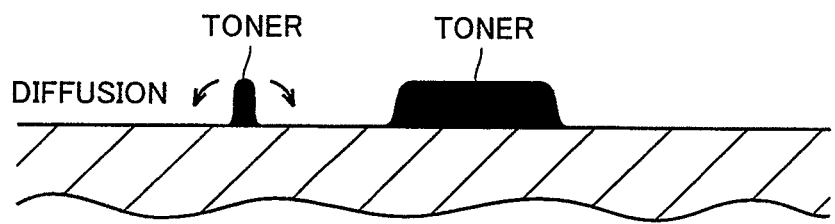
FIGS. 8 and 9 schematically illustrate states in which image reproducibility is degraded in electrophotography.
Figure 9:
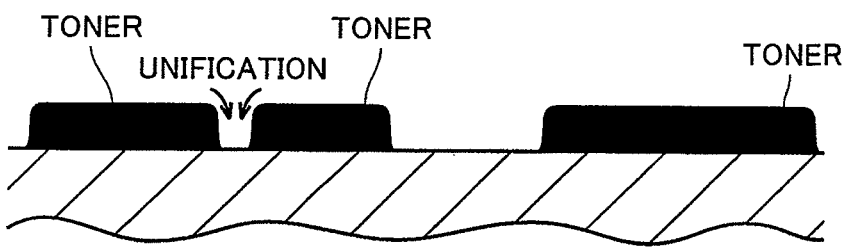

FIGS. 8 and 9 schematically illustrate states in which the image reproducibility is degraded in the electrophotography. FIGS. 8 and 9 are sectional views schematically illustrating media to which the toner image is fixed. However, the size of media is not matched with the actual size.

As illustrated in FIG. 8, it is considered that a linear toner image has a predetermined width in the main-scanning direction or the sub-scanning direction. When the latent image used to form the toner image has a certain level of width, because the electric field between the latent image and the development roller is maintained in a constant direction even if wraparound of a line of electric force is generated by an edge effect, the toner image is stably formed to some extent. Therefore, the stable development can be performed during the development of the charged toner. On the other hand, when the latent image has the small width, the wraparound of the line of electric force becomes prominent by the edge effect on the development region, and the direction of the electric field tends to become instable. Therefore, it is difficult that the toner stably adheres to the narrow region. In the fixing, when the toner image has the large width to some extent, because unification of the toner is generated, the toner is stably fixed to media. On the other hand, for the thin toner image, occasionally the toner cannot stably be fixed to media due to diffusion of the toner. In such cases, the line looks like the state in which the line is cut, or the line cannot be reproduced at all.

As illustrated in FIG. 9, it is considered that the toner image has a gap (where the toner should not exists) having a predetermined width in the main-scanning direction or the sub-scanning direction. When the gap of the toner has a certain level of width, the gap can be maintained even if the gap is affected by the adjacent toner. On the other hand, for the narrow gap, occasionally the gap is filled by the diffusion of the adjacent toner.

In the electrophotography, the reproducibility is possibly degraded for the pattern having the narrow width to which the toner adheres and the pattern having the narrow width to which the toner does not adhere. Accordingly, in the screen group used in the intermediate gradation reproducing processing, preferably both the adhesion region and the non-adhesion region are not narrowed as much as possible.

In the screen groups of FIGS. 2 to 5, the reproduced gradation value is changed by monotonously increasing the area ratio based on the basic shape of the dot or line. Therefore, it is found that the adhesion region and/or the non-adhesion region having only one-pixel width exist in a certain gradation value.

In the screen group of FIG. 6, the dot diameter expands on the low gradation side in the form similar to the dot screen, and the line width expands on the high gradation side in the form similar to the line screen, so that the degradation of the image reproducibility can be suppressed compared with the screens of FIGS. 2 to 5. In the screen of FIG. 7, a length of the non-adhesion region is shortened on the high gradation side while the width of the non-adhesion region is maintained, so that the degradation of the image reproducibility can be suppressed on the high gradation side compared with the screen of FIG. 6.

Screen According to Embodiment

In the plural screens (hereinafter also referred to as a "screen set") that image forming apparatus MFP according to the embodiment uses in the intermediate gradation reproducing processing, compared with the screen group of FIG. 7, the intermediate gradation is more stably reproduced by avoiding the narrowed width of the adhesion region and/or the non-adhesion region.

Figure 10:
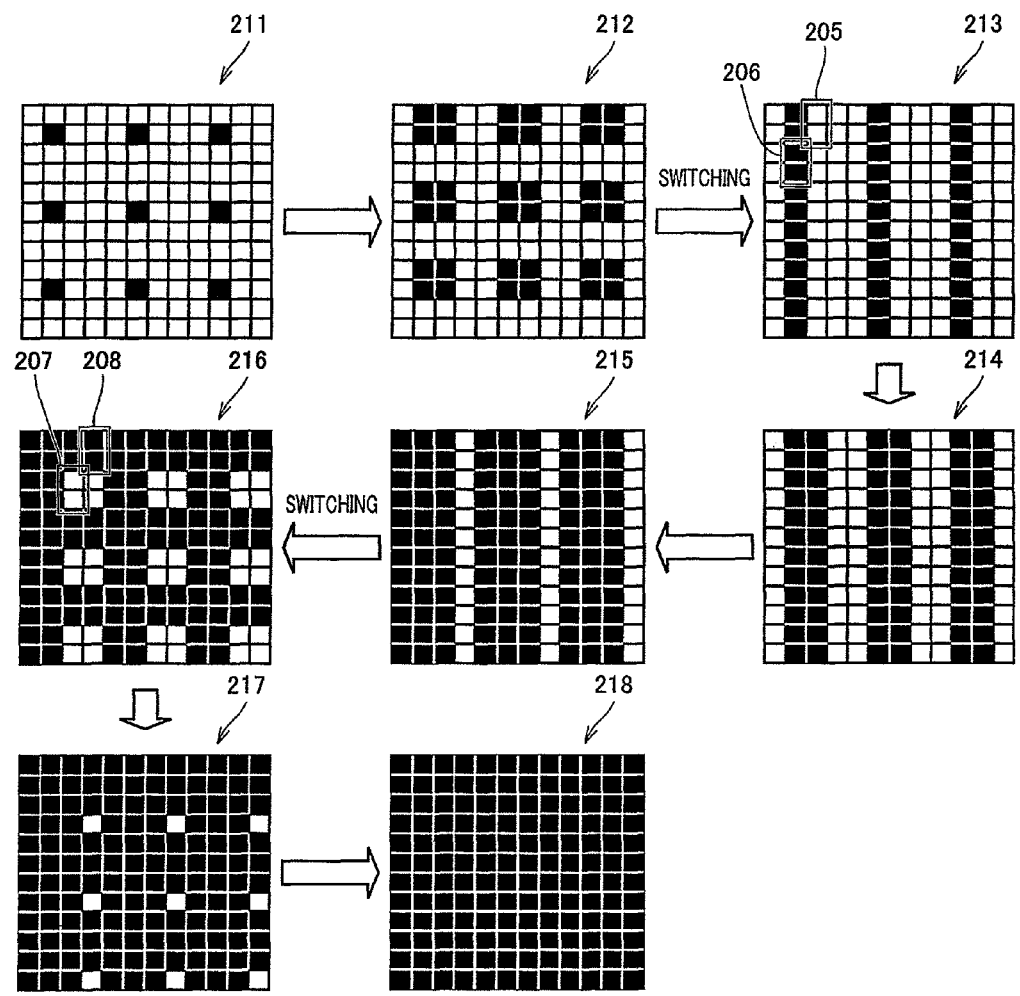
FIG. 10 illustrates an example of a pattern change in a screen set according to an embodiment of the invention.

FIG. 10 illustrates an example of a pattern change in the screen set according to the embodiment of the invention. For the sake of convenience, FIG. 10 illustrates the screens that can be compared to the screens of FIGS. 2 to 7. However, the screens of invention are not limited to the screens of FIG. 10.

In the screen groups of FIGS. 6 and 7, the patter including the adhesion region and/or the non-adhesion region having the narrow width is reduced compared with the screen groups of FIGS. 2 to 5. However, when the non-adhesion regions having the narrow intervals emerge at a certain area ratio, the interval between the non-adhesion regions is not widened even if the non-adhesion regions having the narrow intervals are eliminated.

For example, in the screen group of FIG. 7, the dots adjacent to each other are joined at a stage at which the form similar to the dot screen is changed to the form similar to the line screen. That is, in each dot, the adhesion region expands toward the adjacent dot located on one side of the dot, whereby the line emerges. A gap region 202 having a narrow width is generated between the dots adjacent to each other immediately before the line emerges. Gap region 202 disappears when the dots adjacent to each other are joined. At this point, the width of the non-adhesion region except gap region 202 does not change.

In the screen group of FIG. 7, the dots adjacent to each other are partially joined at a stage at which the form similar to the line screen is changed to the form similar to the dot screen with respect to the non-adhesion region. That is, in each line, the line width partially expands toward the adjacent line located on one side of the line, whereby the dot with respect to the non-adhesion region emerges. A gap region 204 having a narrow width is generated between the lines adjacent to each other immediately before the dot with respect to the non-adhesion region emerges. Gap region 204 disappears by expanding the adhesion region that joins adjacent lines. At this point, the width of the adhesion region except gap region 204 does not change.

On the other hand, in the screen set according to the embodiment, the generation of gap regions 202 and 204 can be prevented without affecting the gradation value of the whole screen. Generally, the screen according to the embodiment largely differs from the screens of FIGS. 2 to 7 in that even the portion that is set in the adhesion region at a certain gradation value is set in the non-adhesion region at a higher gradation value. That is, in the screen of FIGS. 2 to 7, the portion that is set in the adhesion region at a certain gradation value is always set in the adhesion region at the gradation value higher than a certain gradation value. On the other hand, in the screen set according to the embodiment, restrictions of the adhesion region and the non-adhesion region are relaxed to perform the more flexible pattern change.

More specifically, in the screen of FIG. 10, the three screens of the dot screen, the line screen, and an open dot screen are sequentially switched to generate the necessary density change. That is, a pattern 211, a pattern 212, a pattern 213, a pattern 214, a pattern 215, a pattern 216, a pattern 217, and a pattern 218 sequentially change with increasing objective gradation value. Patterns 211 and 212 are the "dot pattern", patterns 213, 214, and 215 are the "line pattern", and patterns 216 and 217 are the "open dot pattern".

As described above, the "dot screen" means the pattern in which the adhesion regions are disposed into the matrix shape while other portions except the adhesion regions are set to the non-adhesion regions. The dot screen has the pattern change in which the adhesion region expands according to the predetermined rule (the expansion of the dot diameter or the increase in the number of dots) in association with the increase in gradation value. The pattern possessed by each screen included in the "dot screen" is also referred to as a "dot pattern".

As described above, the "line screen" means the pattern in which the linear adhesion regions and non-adhesion regions extending in the predetermined direction are alternately disposed. The line screen has the pattern change in which the adhesion region expands according to another independent predetermined rule (the expansion of the line width or the increase in the number of disposed lines) different from the rule of the dot screen in association with the increase in gradation value. The pattern possessed by each screen included in the "line screen" is also referred to as a "line pattern".

The "open dot screen" means the pattern in which the non-adhesion regions are disposed into the matrix shape while other portions except the non-adhesion regions are set to the adhesion regions. The open dot screen has the pattern change in which the non-adhesion region expands according to the predetermined rule (the expansion of the dot diameter or the increase in the number of dots) in association with the decrease in gradation value. The pattern possessed by each screen contained in the "open dot screen" is also referred to as an "open dot pattern".

In FIG. 10, when the dot pattern (pattern 212) is changed to the line pattern (pattern 213) at a specific gradation value in association with the change to the higher gradation value, the line is not generated by expanding the dot illustrated in pattern 212 only in one direction, but the dots partially expand in the direction of the adjacent dot (region 206) while part (region 205) of the dots is changed from the adhesion region to the non-adhesion region. In other words, the adhesion region of region 205 constituting the dot pattern is moved to region 206 to increase the expressed gradation value. The area ratio is kept constant between pattern 212 and pattern 213. This is because the expressed density depends on the screen type (a difference between the dot pattern and the line pattern). That is, even if the screen has the identical area ratio, occasionally one of the screens (in this example, the line pattern) is reproduced with the higher density depending on the value of the area ratio.

The relocation of the adhesion region during switching from the dot pattern to the line pattern can suppress the generation of gap region 202 of FIG. 7 and widen the line width of the non-adhesion region after the switching to the line pattern.

When the line pattern (pattern 215) is switched to the open dot pattern (pattern 216) in association with the change to the higher gradation value, the open dot is not generated by partially expanding the lines illustrated in pattern 215 only in one direction, but the lines partially expand in the direction of the adjacent line (region 208) while part (region 207) of the lines is changed from the adhesion region to the non-adhesion region. In other words, the adhesion region of region 207 constituting the line pattern is moved to region 208 to increase the reproduced gradation value. The area ratio is kept constant between pattern 215 and pattern 216. This is because, as described above, the reproduced gradation value depends on the screen type (the difference between the line pattern and the open dot pattern). The relocation of the adhesion region during switching from the line pattern to the open dot pattern can suppress the generation of gap region 204 of FIG. 7 and maintain the size of two-by-two cell of the open dot. The width of the open dot is larger than that of the non-adhesion region of FIG. 7.

That is, image forming apparatus MFP according to the embodiment retains a first screen group (typically, the series of dot screens) in which the first region (toner adhesion region) expands with increasing gradation value based on a first rule and a second screen group (typically, the series of line screens) in which the first region (toner adhesion region) expands with increasing gradation value based on an independent second rule different from the first rule. The screen is selected from the first screen group when the gradation value to be reproduced is smaller than a first threshold (an intermediate value between the gradation value reproduced by pattern 212 and the gradation value reproduced by pattern 213 of FIG. 10) for the unit region of the input image, and the screen is selected from the second screen group when gradation value is larger than the first threshold.

As described above, preferably image forming apparatus MFP retains the third screen group (typically, the series of open dot screens) in which the second region (toner non-adhesion region) decreases with decreasing gradation value based on the independent third rule different from the first and the second rules. At this point, the screen is selected from the third screen group when the gradation value is larger than the second threshold being larger than the first threshold (an intermediate value between the gradation value reproduced by pattern 215 and the gradation value reproduced by pattern 216 as shown in FIG. 10) for the unit region of the input image.

In other words, image forming apparatus MFP according to the embodiment retains the first screen group (typically, the series of dot screens) including the plural screens having the first pattern defining the first region (toner adhesion region) including the pixels that is the toner adhesion control target and the second screen group (typically, the series of open dot screens) including the plural screens having the second pattern defining the second region including the pixels that are not the toner adhesion control target. The screen is selected from the first screen group such that the first region expands in the predetermined direction in association with the increase in gradation value to be reproduced (for example, the state of pattern 215 illustrated in FIG. 10). The resource from which the screen is selected is switched from the first screen group to the second screen group when the gradation value to be reproduced reaches the predetermined threshold. During the switching the screen, the screen in which the width of the second region in the second pattern is larger than the distance between the adjacent first regions in the first pattern in the predetermined direction is selected (for example, the state of pattern 216 illustrated in FIG. 10).

In still other words, image forming apparatus MFP according to the embodiment retains the first screen group (typically, the series of dot screens) including the plural screens having the first pattern defining the first region (toner adhesion region) including the pixels that is the toner adhesion control target and the second screen group (typically, the series of open dot screens) including the plural screens having the second pattern defining the second region (toner non-adhesion region) including the pixels that are not the toner adhesion control target. The screen is selected from the second screen group such that the second region expands in the predetermined direction with decreasing gradation value (for example, the state of pattern 215 illustrated in FIG. 10). Then the resource from which the screen is selected is switched from the second screen group to the first screen group when the gradation value reaches the predetermined threshold. During the switching the screen, the screen in which the width of the second region in the second pattern is smaller than the distance between the adjacent first regions in the first pattern in the predetermined direction is selected (for example, the state of pattern 216 illustrated in FIG. 10).

When the above-described screen group is adopted, preferably the screen (for example, the state of pattern 212 illustrated in FIG. 10) selected from the first screen group and the screen (for example, the state of pattern 213 illustrated in FIG. 10) selected from the second screen group has the substantially identical gradation value before and after the switching.

Preferably the relocation in which the pixels of the toner adhesion control target in the first region are replaced with the pixels that are not the toner adhesion control target in the second region is performed before and after the switching while the identical gradation value is maintained. For example, when the state of pattern 212 is compared to the state of pattern 213 as shown in FIG. 10, it is found that part of the second region (toner non-adhesion region) is replaced with the first region (toner adhesion region) while the number of first regions (toner adhesion region) is maintained. The same holds true between the state of pattern 215 and the state of pattern 216 as shown in FIG. 10.

In the embodiment, the screen switching is performed using the technique in which even the portion that is set in the adhesion region at certain density is set in the non-adhesion region at higher density. Therefore, the narrowed width of the adhesion region and/or the non-adhesion region can be avoided to more stably reproduce the intermediate gradation.

In FIG. 10, with increasing density, the configuration for switching the screen in the order of the dot pattern, the line pattern, and the open dot pattern is illustrated. Alternatively, the configuration for switching the screen only between the dot screen and the line screen may be adopted from the viewpoint of simplification of switching logic.

Configuration of Controller

Figure 11:
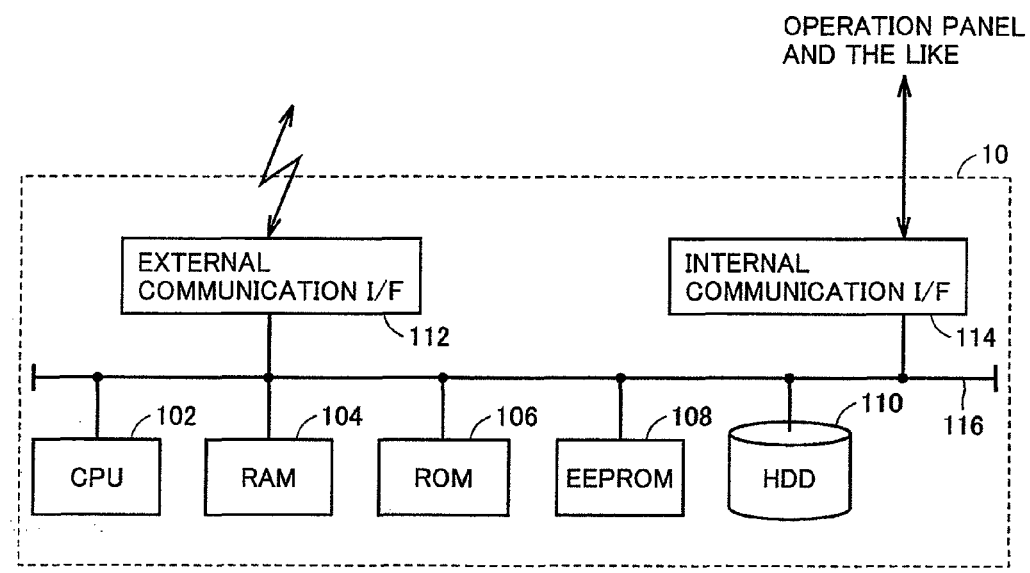
FIG. 11 is a schematic diagram illustrating a hardware configuration of a controller in an image forming apparatus according to an embodiment of the invention.

FIG. 11 is a schematic diagram illustrating a hardware configuration of controller 10 in image forming apparatus MFP according to the embodiment.

Referring to FIG. 11, controller 10 includes a CPU (Central Processing Unit) 102 that is of a processing unit, a RAM (Random Access Memory) 104, a ROM (Read Only Memory) 106, an EEPROM (Electrical Erasable and Programmable Read Only Memory) 108, and an HDD (Hard Disk Drive) 110, which are of storage units, and an external communication I/F (Interface) 112 and an internal communication I/F 114, which are of communication units. These units are connected to one another through an internal bus 116.

In controller 10, CPU 102 loads a program, stored previously in ROM 106 to execute various pieces of processing, in RAM 104 and executes the program to control image forming apparatus MFP.

RAM 104 is a volatile memory used as a work memory. More specifically, in addition to the executed program, the image data of the processing target and various pieces of variable data are tentatively stored in RAM 104. Typically, EEPROM 108 is a nonvolatile semiconductor memory in which various setting values such as an IP address and a network domain of image forming apparatus MFP are stored. Typically, HDD 110 is a nonvolatile magnetic memory in which a print job received from the image processing device and the image information obtained by scanner 3 are stored.

Typically, external communication I/F 112 supports a general-purpose communication protocol such as Ethernet and provides data communication with a personal computer PC or another image forming apparatus through a network NW.

Internal communication I/F 114 is connected to an operation panel. Internal communication I/F 114 receives a signal corresponding to the user operation performed to the operation panel and transmits the signal to CPU 102, and internal communication I/F 114 transmits a signal necessary to display a message on the operation panel in response to a command from CPU 102.

Control Structure

Figure 12:
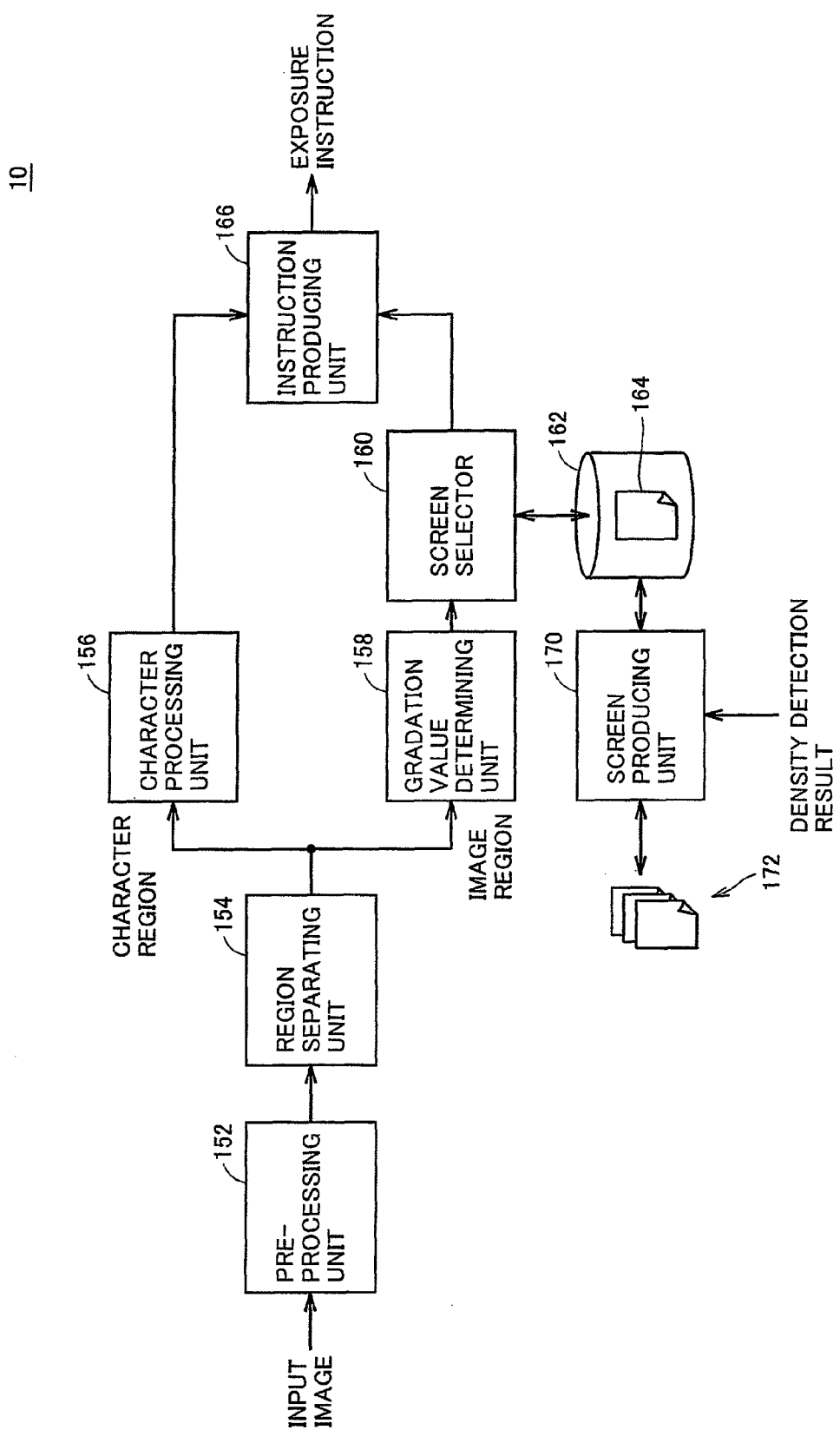
FIG. 12 is a block diagram illustrating a control structure of the controller in the image forming apparatus according to an embodiment of the invention.

FIG. 12 is a block diagram illustrating a control structure of controller 10 in image forming apparatus MFP according to the embodiment of the invention.

Referring to FIG. 12, controller 10 outputs an instruction (exposure instruction) to the exposure device to form the electrostatic latent image corresponding to the input image of the print target on the photosensitive body (photosensitive drum 41). More specifically, controller 10 includes a pre-processing unit 152, a region separating unit 154, a character processing unit 156, a gradation value determining unit 158, a screen selector 160, a screen storage 162, an instruction producing unit 166, and a screen producing unit 170 as a control structure. Screen storage unit 162 is provided as a predetermined region included in RAM 103, EEPROM 107, and HDD 109 (see FIG. 11). Typically, other units are provided such that CPU 101 (see FIG. 11) loads the program in RAM 103 (FIG. 11) to, execute each command.

Pre-processing unit 152 performs pre-processing such as color correction to the input image of the print target. The input image processed by pre-processing unit 152 is output to region separating unit 154.

Region separating unit 154 separates the input image received from pre-processing unit 152 into a character region and an image region. Basically, the character region needs not to be reproduced as the intermediate gradation, and the image region needs to be reproduced as the intermediate gradation. The character region information separated by region separating unit 154 is output to character processing unit 156, and the image region information is output to gradation value determining unit 158.

Character processing unit 156 performs processing such as contour enhancement, which is suitable to the character, to the character region information received from region separating unit 154. Character processing unit 156 outputs the processing result to instruction producing unit 166.

Gradation value determining unit 158 determines of the gradation value to be reproduced in each predetermined unit region based on the image region information received from region separating unit 154. Gradation value determining unit 158 outputs the determination result to screen selector 160.

Based on the determination result received from gradation value determining unit 158, screen selector 160 sequentially selects the screen corresponding to the density to be reproduced and maps the type of the screen to be used with respect to the image region. More specifically, screen selector 160 refers to a screen set 164 stored in screen storage unit 162 and determines the screen corresponding to the density to be reproduced. Screen selector 160 outputs the mapping result to instruction producing unit 166.

Screen selector 160 also performs the adhesion region relocating processing illustrated in FIGS. 11 to 14.

Instruction producing unit 166 combines the processing result received from character processing unit 156 and the mapping result received from screen selector 160, thereby producing the exposure instruction corresponding to the input image. The exposure instruction is output to image writing unit 43 (see FIG. 1). That is, the image forming processing is performed according to the screen selection result by the exposure instruction.

Screen producing unit 170 produces or updates screen set 164 stored in screen storage unit 162 as needed basis. That is, because the image forming process changes according to a usage environment, a use frequency, and a degradation state of image forming apparatus MFP, screen producing unit 170 properly produces or updates a screen characteristic according to the process changes. Typically, screen producing unit 170 determines screen set 164 by properly combining previously-prepared screen groups 172 based on a deviation of an actual density gradation characteristic to an objective density gradation characteristic in the toner image or the print output. The screen set producing/updating processing will be described in detail below. Screen Set Producing/Updating Processing In the image forming apparatus in which the screens of FIGS. 2 to 7 are used, the process is destabilized at a specific area ratio and occasionally the objective gradation value cannot be reproduced. That is, the ideal image producing processing cannot be performed when gap regions 202 and 204 (FIGS. 6 and 7) are generated in the screen. Therefore, in the image forming apparatus, the correction is performed with IDC sensor 49 (FIG. 1) such that the objective density can be reproduced in any gradation level.

In image forming apparatus MFP according to the embodiment, the density of the toner image actually formed by print engine 4 is detected by IDC sensor 49, and the screen set that can reproduce the objective gradation value is produced and/or updated based on the detection result of IDC sensor 49.

Figure 13A:
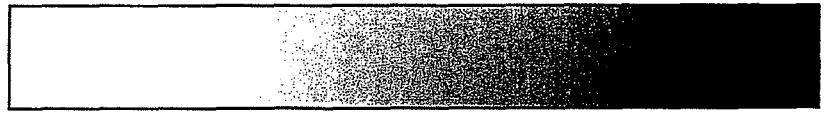
FIGS. 13A and 13B are views illustrating screen set producing/updating processing according to an embodiment of the invention.
Figure 13B:
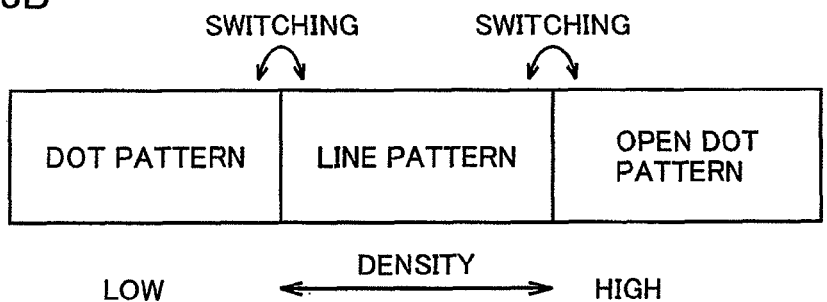
Figure 14:
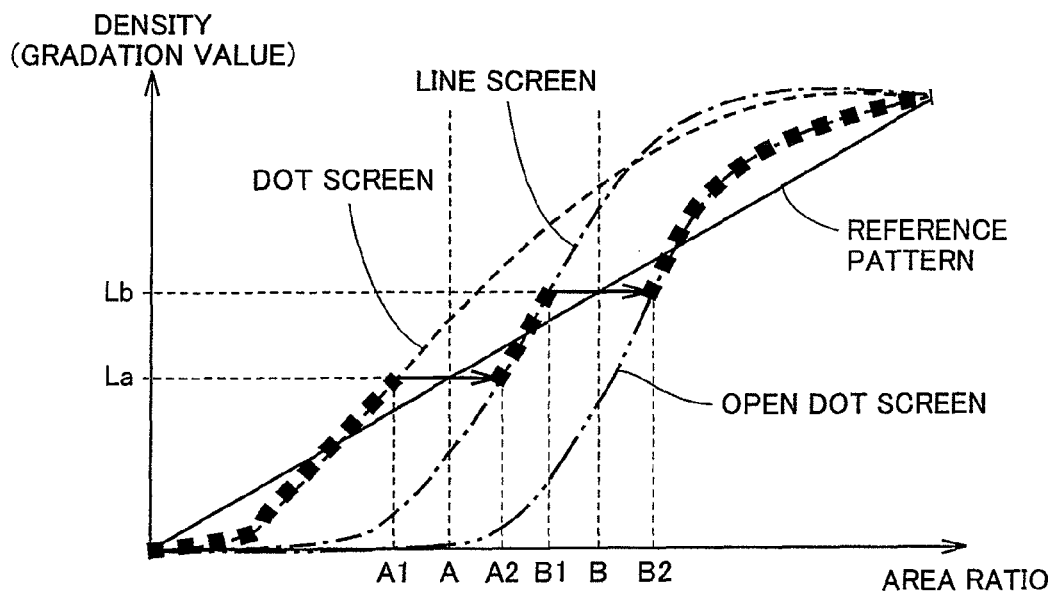
FIG. 14 illustrates an example of a screen-by-screen gradation characteristic.
Figure 15A:
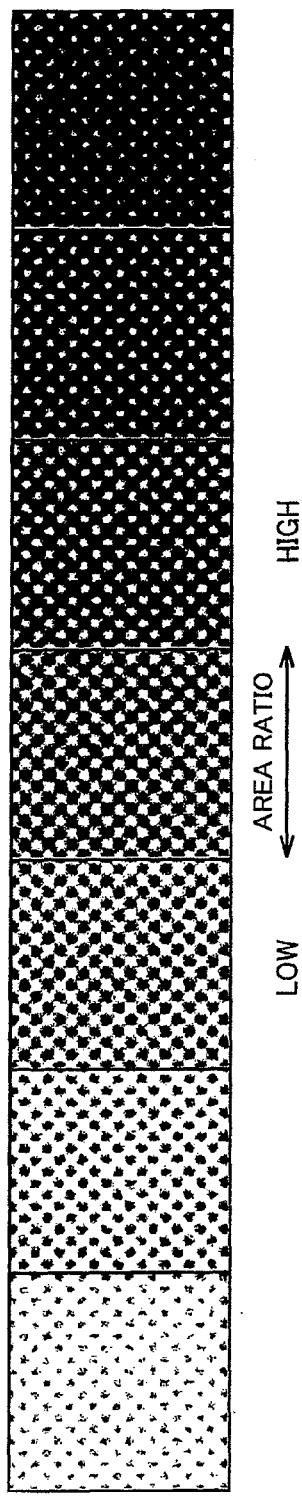
FIGS. 15A and 15B illustrate examples of the dot screen and the line screen.
Figure 15B:
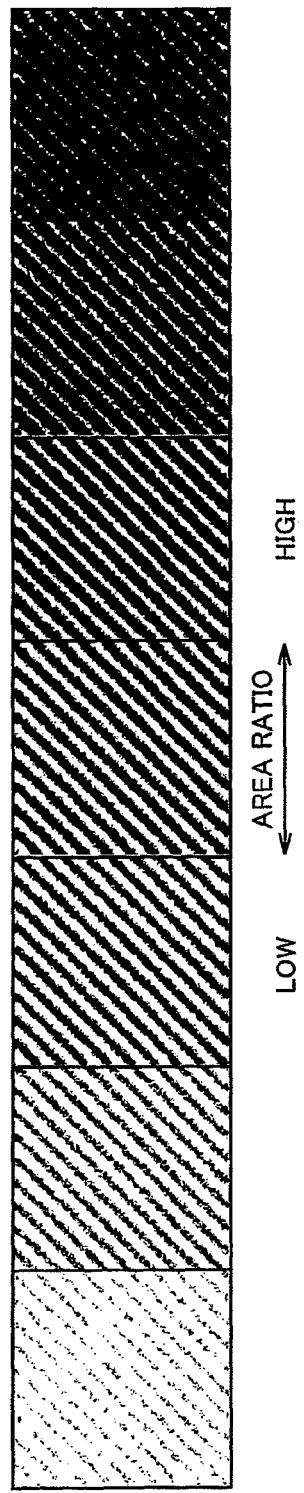

FIGS. 13A and 13B are views illustrating screen set producing/updating processing according to the embodiment of the invention. FIG. 14 illustrates an example of a screen-by-screen gradation characteristic. FIGS. 15A and 15B illustrate examples of the dot screen and the line screen.

The gradation characteristic is obtained for each of previously-prepared screen groups 172 (the dot screen, the line screen, and the open dot screen). Specifically, a reference pattern having plural different gradation values illustrated in FIG. 13A is used as the input image, and the image forming processing is repeatedly performed by the number of types of the screens included in screen group 172. IDC sensor 49 detects the density of each toner image formed through the image forming processing. That is, the gradation characteristic is obtained with respect to the dot screen from the result in which IDC sensor 49 detects the density of the image formed according to the reference pattern of FIG. 13A using the pattern included in the dot screen. According the similar procedure, the gradation characteristics are obtained with respect to the line screen and the open dot screen from the result in which IDC sensor 49 detects the density of the image formed according to the reference pattern of FIG. 13A using the pattern included in each of the line screen and the open dot screen.

FIG. 1 illustrates the configuration in which IDC sensor 49 detects the density of the toner image on photosensitive drum 41 by way of example. Alternatively, the density on media to which the toner image is transferred may be detected. In the image forming apparatus including the intermediate transfer body (for example, transfer belt), the density of the toner image on the intermediate transfer body may be detected.

Actually, the input image may be produced by scanning the document in which the reference pattern of FIG. 13A is printed with scanner 3 (see FIG. 1), or data including the image information illustrated in FIG. 13A may directly be input. FIG. 13A illustrates a so-called gradation pattern in which the density continuously changes by way of example. Alternatively, a so-called patch pattern in which plural patterns having discretely different pieces of density are disposed may be used.

FIG. 14 illustrates an example of the obtained gradation characteristic. In the reference pattern of FIG. 13A, because a rate of density change is kept constant in a longitudinal direction, a rate of area-ratio change is kept constant in the longitudinal direction in the screen. Therefore, for each screen, a relationship between the area ratio (corresponding to the position of the actually produced toner image) and the actual density (gradation value) is illustrated in FIG. 14. In the gradation characteristic of FIG. 14, a deviation between the gradation characteristic (objective gradation characteristic) of the reference pattern and the gradation characteristic of each screen corresponds to the amount to be corrected. In other words, the process is destabilized with increasing deviation from the gradation characteristic of the reference pattern.

For example, as to the gradation characteristic of the dot screen, the objective gradation value can be reproduced from a relatively small range of the area ratio. On the other hand, as to the gradation characteristic of the line screen, the gradation value cannot effectively be reproduced until the area ratio increases to some extent (a range of the area ratio of A or less in FIG. 14). In a range of the area ratio of A to B, the line screen exhibits the gradation characteristic that is better matched with the reference pattern than that of the dot screen. In a range of the area ratio of B or more, the line screen tends to deviate from the reference pattern.

The difference of the gradation characteristic is generated due to the difference of the area ratio at which the process is destabilized. That is, in the dot screen, the black dot can be reproduced even if the area ratio is relatively low as illustrated in FIG. 15A. On the other hand, in the line screen, the black line is not partially reproduced when the area ratio is relatively low as illustrated in FIG. 15B, and therefore the actually emerging density becomes lower than the objective density. That is, the dot screen includes the pattern having the gradation value that is relatively larger than that of the pattern having the identical area ratio included in the line screen when the area ratio is relatively low.

In the line screen, as illustrated in FIG. 15B, the gap between the adjacent black lines is not partially reproduced when the area ratio is relatively high, and therefore the actually emerging density becomes higher than the objective density.

The experiments of the inventors show that the deviation amount from the gradation characteristic of the reference pattern is strongly correlated with right or wrong of the granularity. More specifically, for an organoleptic value (GI value) obtained by an evaluation method proposed by the applicant, the dot screen and the line screen were compared with respect to the number of screen lines of plural types. As a result, the dot screen was excellent for the granularity when the gradation value to be reproduced is relatively low. On the other hand, the line screen was excellent for the granularity in the neighborhood of a median value of the gradation value to be reproduced.

Accordingly, preferably the screen set in which the dot pattern, the line pattern, and the open dot pattern are sequentially switched from the low gradation side as illustrated in FIG. 13B is used when the three types of the screens of the dot screen, the line screen, and the open dot screen can be prepared.

Preferably the screen set in which the dot pattern, the line pattern, and the dot pattern or the dot pattern and the line pattern are sequentially switched from the low gradation side is used when the two types of the screens of the dot screen and the line screen can be prepared.

Referring to FIG. 14, a determination at which gradation value the screen used is switched is made based on the deviation amount from the gradation value of the reference pattern. For example, in FIG. 14, the dot screen is smaller than the line screen in the deviation from the reference pattern in the range lower than a density La, and the line screen is smaller than the dot screen in the deviation from the reference pattern in the range higher than density La. Similarly, the line screen is smaller than the open dot screen in the deviation from the reference pattern in the range lower than a density Lb, and the open dot screen is smaller than the line screen in the deviation from the reference pattern in the range higher than density Lb. Therefore, density La and density Lb can be determined as a switching point of the screen. The switching point is determined by computing the deviation in the gradation characteristic of each screen to the reference pattern for each piece of density. That is, the switching point is determined based on the gradation characteristic of each screen such that an error reduces with respect to the gradation characteristic corresponding to the reference pattern.

In the screen set, it is necessary that the gradation values be equal to each other before and after the switching at the gradation value in which the type of the screen used is changed. This is because the gradation difference occasionally generates a pseudo-contour between the regions printed using different screens when the input image having the gradation change is printed. Therefore, as illustrated in FIG. 14, when the dot screen is switched to the line screen at density La, the pattern of the line screen corresponding to an area ratio A2 is used subsequent to the pattern of the dot screen corresponding to an area ratio A1. Similarly, when the line screen is changed to the open dot screen at density Lb, the pattern of the open dot screen corresponding to an area ratio B2 is used subsequent to the pattern of the line screen corresponding to an area ratio B1.

In addition to or instead of the configuration in which the screen set is produced and/or updated based on the density of the toner image actually formed using the IDC sensor, a screen set having a standard gradation characteristic is previously prepared, and the previously-prepared screen set may be corrected according to the image producing conditions such as the usage environment, use frequency, degradation state, and process setting condition of image forming apparatus MFP. Therefore, it is not necessary to detect the density of the actually-formed toner image, so that productivity of image forming apparatus MFP can be improved.

Data Structure of Screen Set

Figure 16:
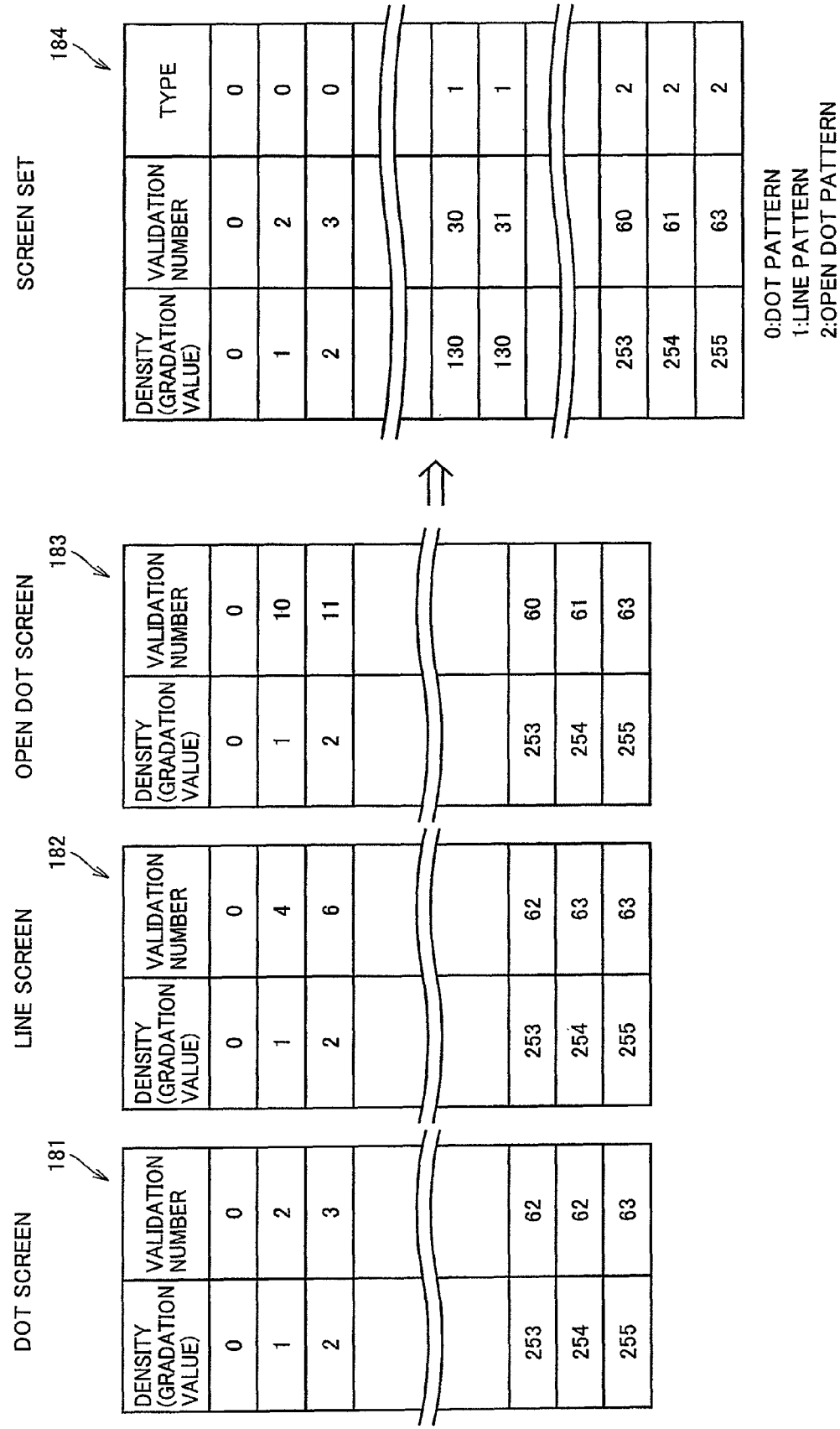
FIG. 16 illustrates an example of a screen table retained by an image forming apparatus MFP according to an embodiment of the invention.

An example of the data structure used to execute the screen set producing/updating processing will be described below. FIG. 16 illustrates an example of a screen table retained by image forming apparatus MFP according to the embodiment of the invention. FIGS. 17A to 17F, 18A to 18F, and 19A to 19F illustrate examples of the pattern changes that emerge on the screens. FIGS. 20A to 20F, 21A to 21F, and 22A to 22F illustrate other examples of the pattern changes that emerge on the screens.

As illustrated in FIG. 16, image forming apparatus MFP according to the embodiment retains screen tables 181, 182, and 183 as part of screen group 172 (see FIG. 12). Pieces of information for reproducing the objective gradation values using the dot screen, the line screen, and the open dot screen are described in screen tables 181, 182, and 183, respectively. The data structure of the screen according to the embodiment will be described prior to the description of the pieces of information described in the screen tables.

As described above, in order to reproduce the intermediate gradation using the screen technology, it is necessary to prepare the plural screens according to the reproducible gradation values. It is also possible to individually prepare the series of screen groups according to the gradation values. However, from the viewpoints of the suppression of the storage capacity and the improvement of the maintenance, elements constituting the screen are numbered, and the screen group is provided by assigning the number indicating to which element is validated.

For example, FIGS. 17A to 17F, 18A to 18F, and 19A to 19F illustrate examples in which four screens whose one unit includes a square of an eight-by-eight cell are disposed. FIGS. 17A to 17F illustrate examples of the dot screen, FIGS. 18A to 18F illustrate examples of the line screen, and FIGS. 19A to 19F illustrate examples of the open dot screen. In the screens illustrated in FIGS. 17A to 17F, 18A to 18F, and 19A to 19F, angles (screen angle) and the numbers of lines (the number of screen lines) are matched with one another. As used herein, the screen angle means an array direction of the adhesion regions (or non-adhesion regions) in each pattern, and a vertical direction of the paper surface becomes the screen angle in the examples of FIGS. 17A to 17F, 18A to 18F, and 19A to 19F. The number of lines of the screen means the number of unit screens per unit length, and an inverse number of a screen interval becomes the number of lines in the examples of FIGS. 17A to 17F, 18A to 18F, and 19A to 19F. Generally the number of screen lines is defined using a unit "lpi: line per inch".

Figures 17A, 17B, 17C:
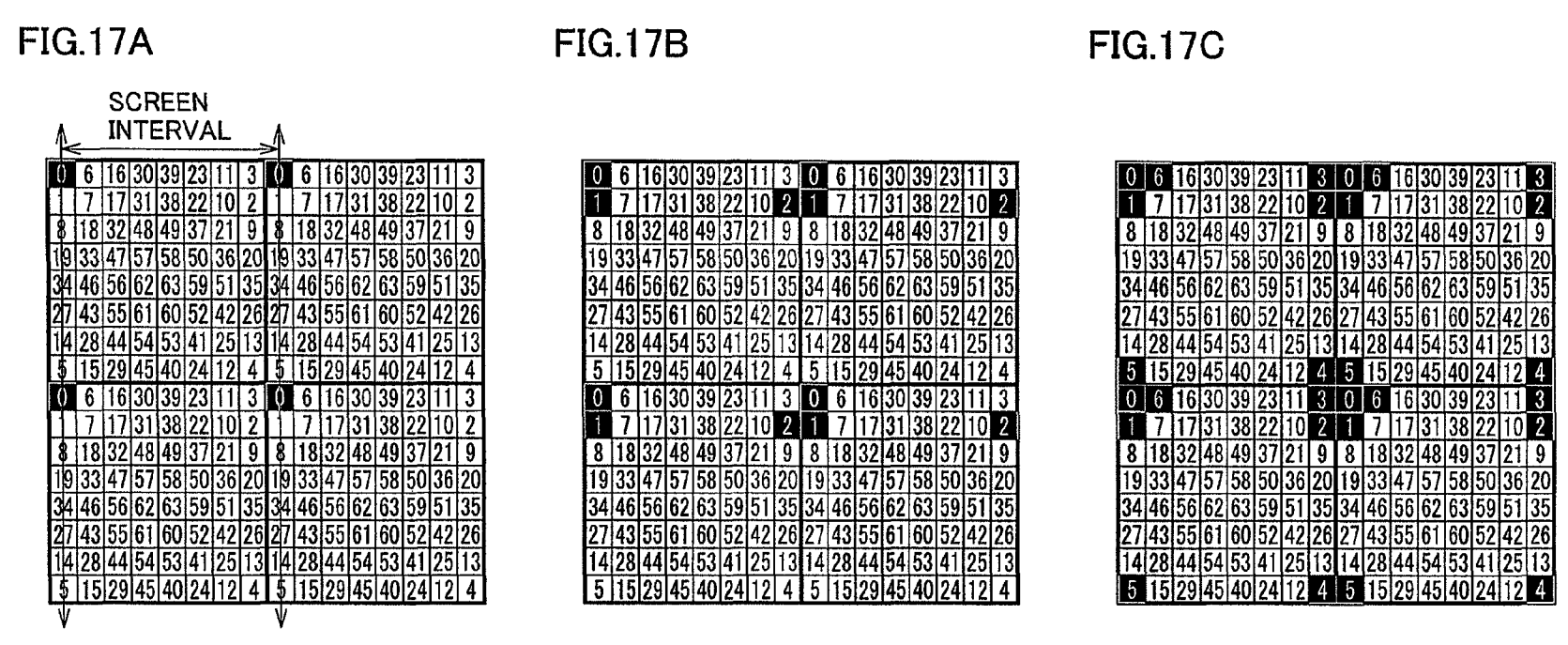
Figures 17D, 17E, 17F:
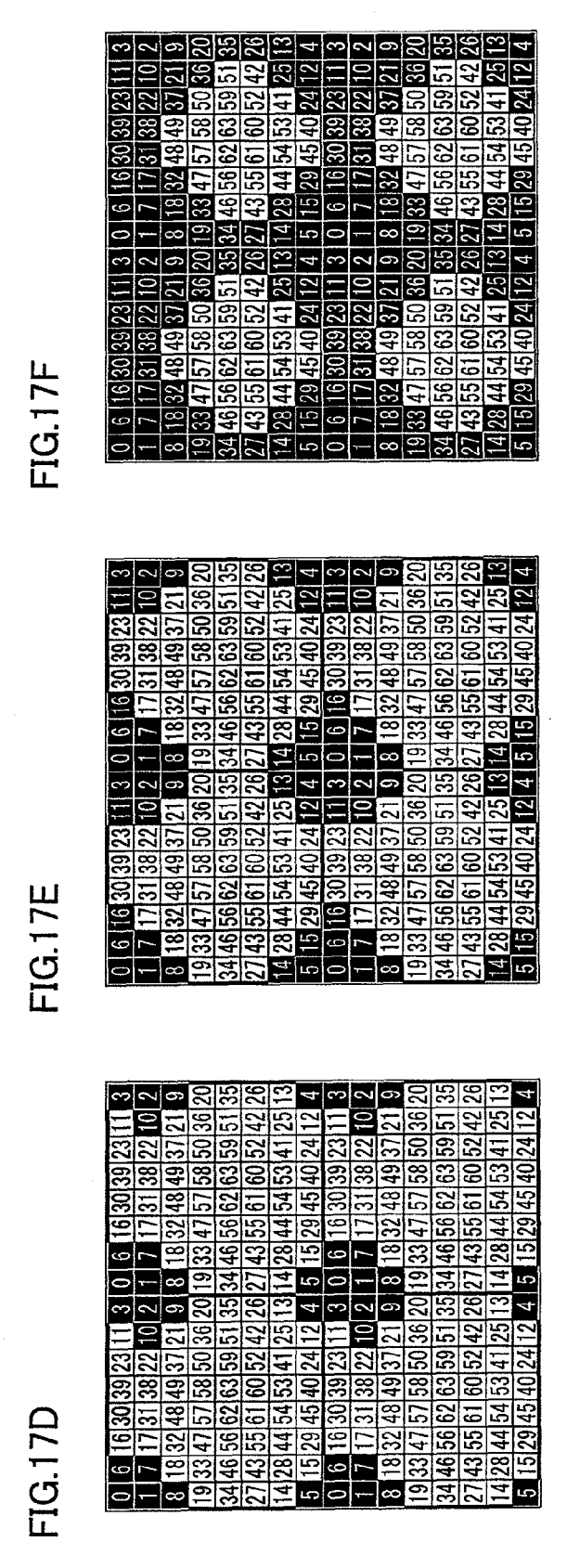

For example, as illustrated in FIGS. 17A to 17F, numbers "0" to "63" are uniquely allocated to the total of 64 cells of eight cells by eight cells. In screen table 181 (see FIG. 16), to which number possessed by the cell should become the "black" (adhesion region) is defined as a "validation number" while correlated with each objective gradation value. For example, the dot screen of FIG. 17A is output when the "validation number" is set to "0". Similarly, the dot screen of FIG. 17B is output when the "validation number" is set to "2". Similarly, the "dot" around the cell to which "0" is allocated increases with increasing validation number, that is, the dot diameter increases with increasing validation number.

Similarly, the line screen change illustrated in FIGS. 18A to 18F is defined in screen table 182 (see FIG. 16). In the line screen, the "line" passing through the cell to which "0" is allocated is thickened with increasing validation number, that is, the line width increases with increasing validation number.

Similarly, the open dot screen change illustrated in FIGS. 19A to 19F is defined in screen table 183 (see FIG. 16). In the open dot screen, the "open dot" around the cell to which "0" is allocated increases with increasing validation number, that is, the dot diameter increases with increasing validation number.

FIGS. 20A to 20F, 21A to 21F, and 22A to 22F illustrate examples of the screen having an angle in an oblique direction with respect to the paper surface. In the dot screens of FIGS. 20A to 20F, similarly to the dot screens of FIGS. 17A to 17F, the "dot" around the cell to which "0" is allocated increases with increasing validation number, that is, the dot diameter increases with increasing validation number. In the line screens of FIGS. 21A to 21F, similarly to the line screens of FIGS. 18A to 18F, the "line" passing through the cell to which "0" is allocated is thickened with increasing validation number, that is, the line width increases with increasing validation number. In the open dot screens of FIGS. 22A to 22F, similarly to the open dot screen of FIGS. 19A to 19F, the "open dot" around the cell to which "0" is allocated increases with increasing validation number, that is, the dot diameter increases with increasing validation number.

Referring to FIG. 16, the objective gradation value and the validation number corresponding to the gradation value are defined in each of screen tables 181, 182, and 183. The defined contents correspond to an inverse function of the gradation characteristic of the screen illustrated in FIG. 14. That is, the area ratio corresponding to each gradation value (vertical axis) in the gradation characteristic of the screen of FIG. 14 is substantially defined in each of screen tables 181, 182, and 183. Therefore, the portion in which validation number discretely changes with respect to the continuously-changing gradation value exists in each of screen tables 181, 182, and 183.

Information for defining the screen set according to the embodiment is described in screen table 184. Specifically, when the switching point of the screen is obtained through the screen set producing/updating processing, only a portion corresponding to the switching point is extracted from the pieces of information described in screen tables 181, 182, and 183, and the extracted portion is integrated as screen table 184. Similarly to screen tables 181, 182, and 183, the gradation value and the corresponding validation number are defined in screen table 184, and a "type" that is of information indicating which screen is used is also defined in screen table 184. In the example of FIG. 16, a type "0" means the "dot pattern", a type "1" means the "line pattern", and a type "2" means the "open dot pattern". As described above, because the screen is switched from the low gradation side in the order of the dot pattern, the line pattern, and the open dot pattern in the screen set, the type also changes from the low gradation side in the order of "0", "1", and "2" in screen table 184.

In image forming apparatus MFP according to the embodiment, screen table 184 is produced from previously-prepared screen tables 181, 182, and 183, so that the screen set can dynamically be corrected according to a process variation.

Pseudo-contour

When the intermediate gradation reproducing processing is executed using the screen set produced by the combination of the dot screen, the line screen, and the open dot screen, the pseudo-contour is possibly generated depending on the gradation-value changing direction in the input image. The pseudo-contour will be described below while classified according to the relationship between the gradation-value changing direction and the screen angle.

Figure 23:
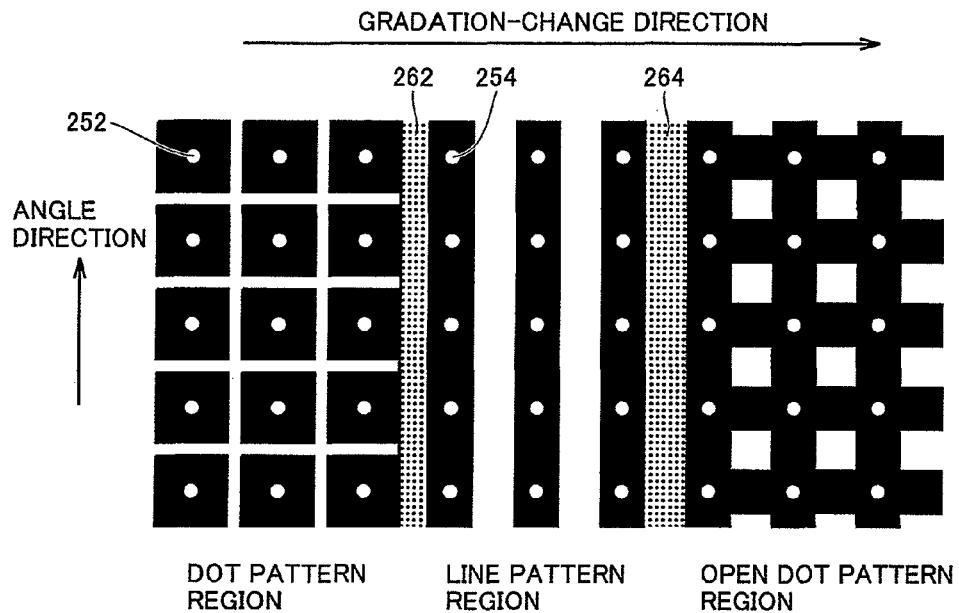
FIGS. 23 to 25 are views illustrating contents of screen processing according to an embodiment of the invention.
Figure 24:
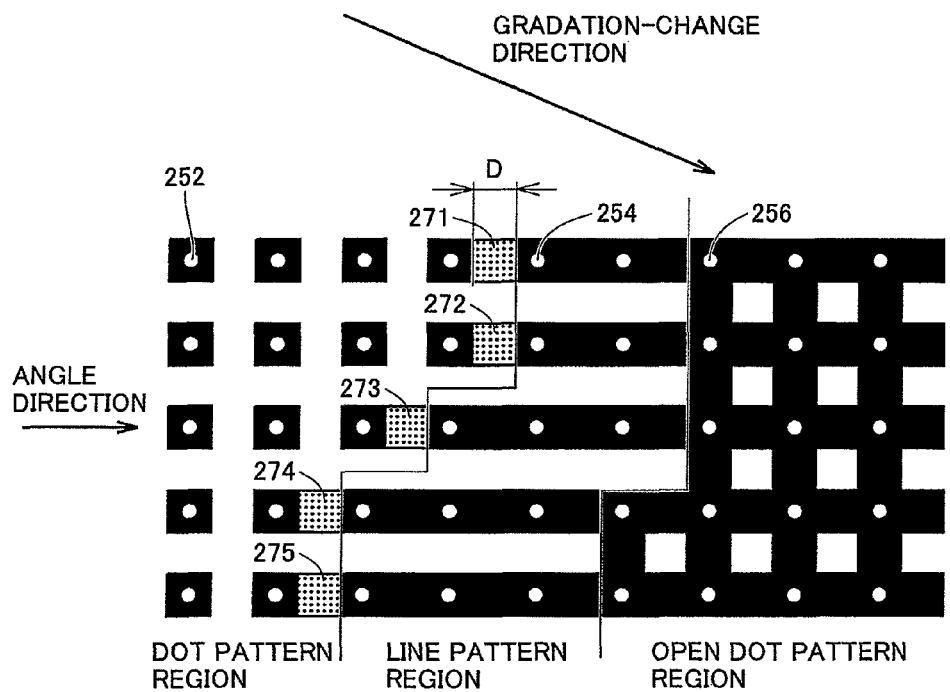
Figure 25:
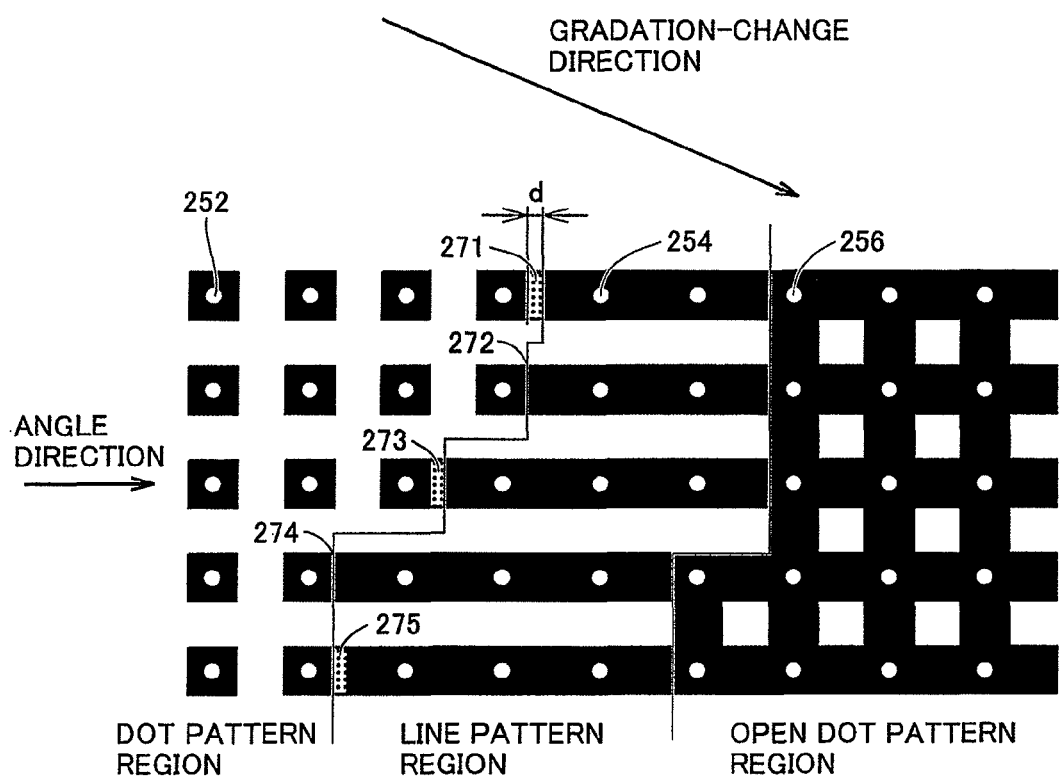
Figure 26A:
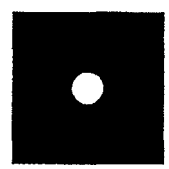
FIGS. 26A to 26C are views illustrating a detailed joining portion.
Figure 26A:
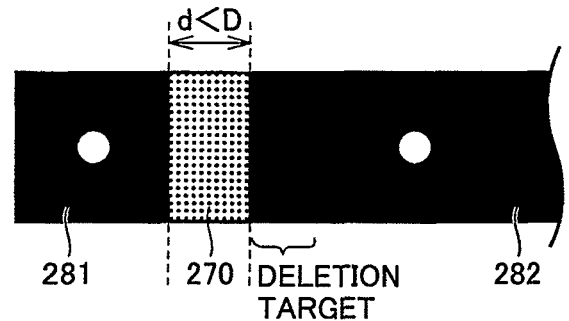
Figure 26B:
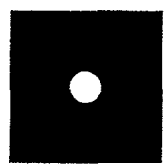
Figure 26B:
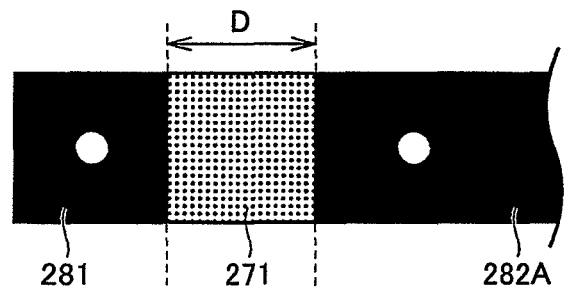
Figure 26C:
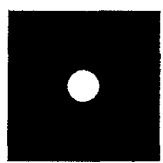
Figure 26C:
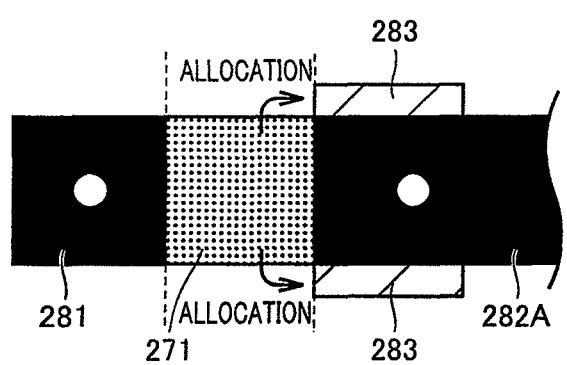

FIGS. 23 to 25 are views illustrating contents of the screen processing according to the embodiment of the invention. FIGS. 26A to 26C are views illustrating the detailed joining portion of FIG. 24. As illustrated in FIGS. 23 to 25, hereinafter it is assumed that the plural screens (the dot screen, the line screen, and the open dot screen) constituting the screen set are substantially equal to one another in the angle and the number of lines. It is also assumed that a center point 252 of each dot in the dot pattern, a center point 254 of the line in the line pattern, and a grid intersection 256 of the open dot in the open dot pattern are disposed so as to be matched with reference disposition points in order to improve the granularity in the print result.

(1) The case in which a parallel component does not exist between the gradation-change direction and the screen-angle direction Referring to FIG. 23, the case in which the gradation-change direction in the input image is a horizontal direction of the paper surface while the screen-angle direction is a vertical direction of the paper surface, that is, the case in which the parallel component does not exist between the gradation-change direction and the screen-angle direction will be described. In the gradation change in the input image, it is assumed that the left side of the paper surface is the low gradation value while the right side of the paper surface is the high gradation value. When the input image is reproduced, the screen used is switched from the left side of the paper surface in the order of the dot screen, the line screen, and the open dot screen.

In FIG. 23, the different types of the screens are joined in the direction different from the angle direction. That is, a void portion 262 extending in the screen-angle direction is generated between the dot pattern region (first portion) and the line pattern region (second portion). A void portion 264 extending in the screen-angle direction is generated between the line pattern region and the open dot pattern region (third portion).

Therefore, the different screens are not unified, and the pseudo-contour is not generated.

(2) The case in which the parallel component exists between the gradation-change direction and the screen-angle direction Referring to FIG. 24, the case in which the gradation-change direction in the input image is an oblique direction of the paper surface while the screen-angle direction is the horizontal direction of the paper surface, that is, the case in which the parallel component exists between the gradation-change direction and the screen-angle direction will be described. In the gradation change in the input image, it is assumed that the upper left side of the paper surface is the low gradation value while the lower right side of the paper surface is the high gradation value. When the input image is reproduced, the screen used is switched from the upper left side of the paper surface in the order of the dot screen, the line screen, and the open dot screen.

In FIG. 24, the different types of the screens are joined in the direction identical to the angle direction. Therefore, the existence of the void between the dot pattern region and the line pattern region depends on the area ratio of each screen.

That is, when the area ratio is relatively large, as illustrated in FIG. 25, an interval (d) is insufficiently obtained in the joining portion between the dot pattern region and the line pattern region, and the dot pattern region and the line pattern region are substantially unified. As a result, image noises such as the pseudo-contour are generated because the gradation value that is different from that of the adjacent region emerges in the unified region.

Relocation Control of Joining Portion

In the screen processing according to the embodiment, when the different types of the screens are close to each other, the pattern is corrected such that the screens are separated from each other by a predetermined width. More specifically, as illustrated in FIG. 24, in the joining portion between the dot pattern region (first portion) and the line pattern region (second portion), the region (second region) including the pixels that are not the toner adhesion control target is disposed between the dot pattern region and the line pattern region, and the pattern of the joining portion is corrected such that gap portions 271 to 275 having a predetermined width D exist.

FIGS. 26A to 26C illustrate examples of the pattern correction. As illustrated in FIG. 26A, it is assumed that width d of gap portion 270 between an adhesion region 281 included in the dot pattern and an adhesion region 282 included in the adjacent line pattern is smaller than a predetermined value D when the intermediate gradation processing is executed using the previously-set screen set. In such cases, for example, part of adhesion region 282 included in the line screen is eliminated (see FIG. 26A), and the region (second region) including the pixels that are not the toner adhesion control target is disposed, thereby providing gap portion 271 having the width of predetermined value D (see FIG. 26B). Preferably, from the viewpoint of the improvement of the pseudo-contour, predetermined value D is set to an interval between the dots near the joining portion of the dot pattern adjacent to the line pattern.

When part of adhesion region 282 included in the line screen is eliminated and changed to the non-adhesion region, the area ratio in the line screen deviates from the objective value. When the objective area ratio is relatively small, it is expected that the deviation of the area ratio affects the objective value. Accordingly, preferably the control is performed such that the portion that is eliminated from the adhesion region in order to maintain the width of the gap portion is added to the different portion of the original adhesion region. That is, in the examples of FIGS. 26A to 26C, an adhesion region 283 corresponding to the eliminated portion is added to an adhesion region 282A after part of original adhesion region 282 is eliminated in the width direction of the line pattern (see FIG. 26C). Therefore, the pattern correction can suppress the generation of the image noise caused by the change in area ratio while suppressing the generation of the pseudo-contour.

As described above, the screen selector selects the screen in each unit region having the intermediate gradation, and the dot screen (dot pattern region) is selected for the first portion while the line screen (line pattern region) is selected for the second portion adjacent to the first portion. In such cases, before the print engine performs the image forming processing, the adhesion regions are relocated according to the parallel component of the gradation-change direction and the screen-angle direction such that the non-adhesion regions having the predetermined interval exist between the adhesion region for expressing the dot pattern region and the adhesion region for expressing the line pattern region. Preferably the adhesion regions are relocated while the area of the adhesion region is maintained in the unit region.

It is not necessary to provide the non-adhesion region between the line pattern region and the open dot pattern region. Because the area of the non-adhesion region is controlled in the open dot pattern region, the problem of the unification of the adhesion regions is not generated.

That is, when the dot screen is selected for the first portion while the line screen is selected for the second portion, the image is relocated such that the toner non-adhesion region is disposed between the first portion and the second portion. On the other hand, when the line screen is selected for the first portion while the open dot screen is selected for the second portion, the control is performed such that the image is not relocated in the joining portion.

Processing Procedure

Figure 27:
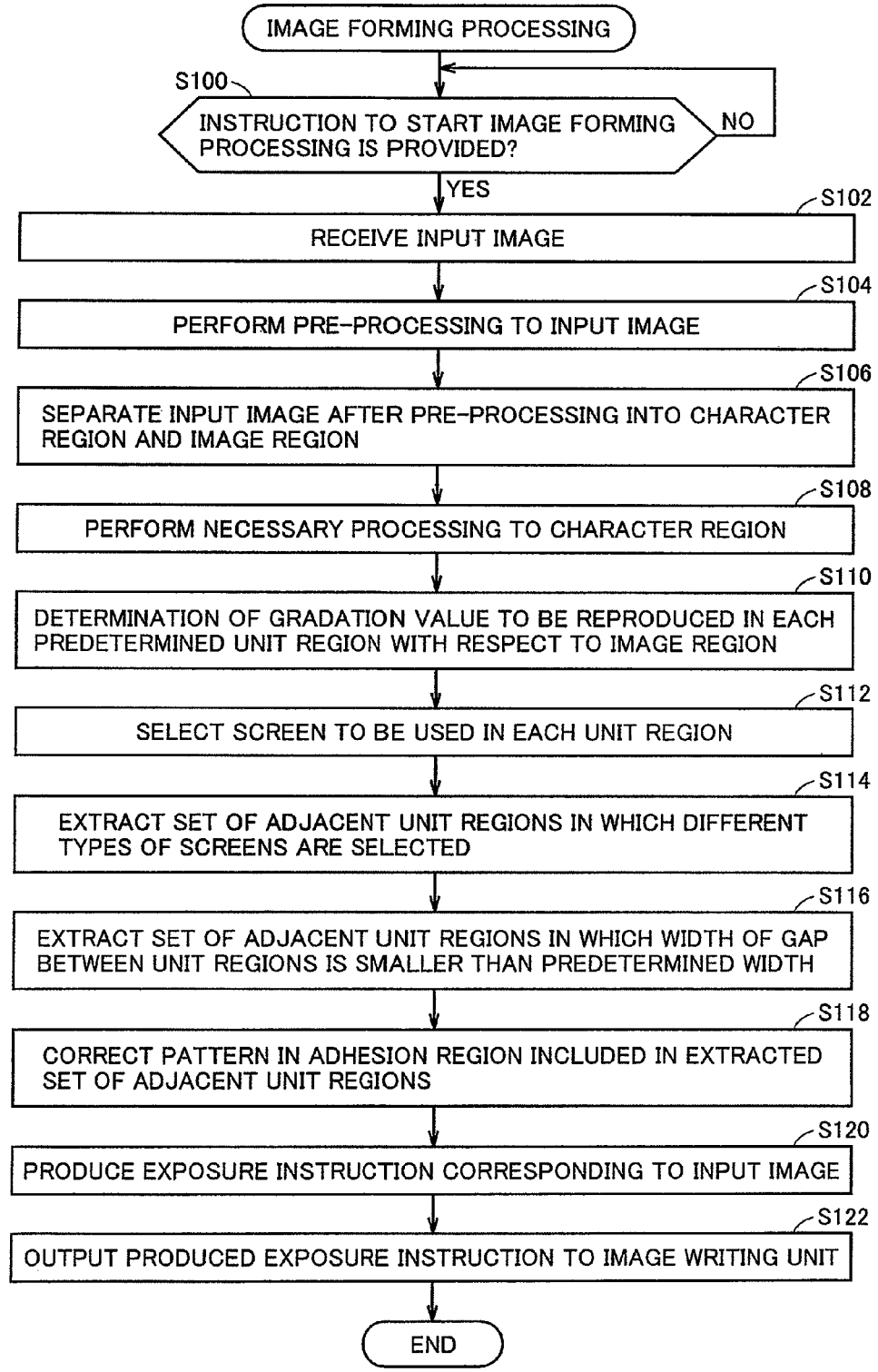
FIG. 27 is a flowchart illustrating an image forming processing procedure in the image forming apparatus according to an embodiment of the invention.
Figure 28:
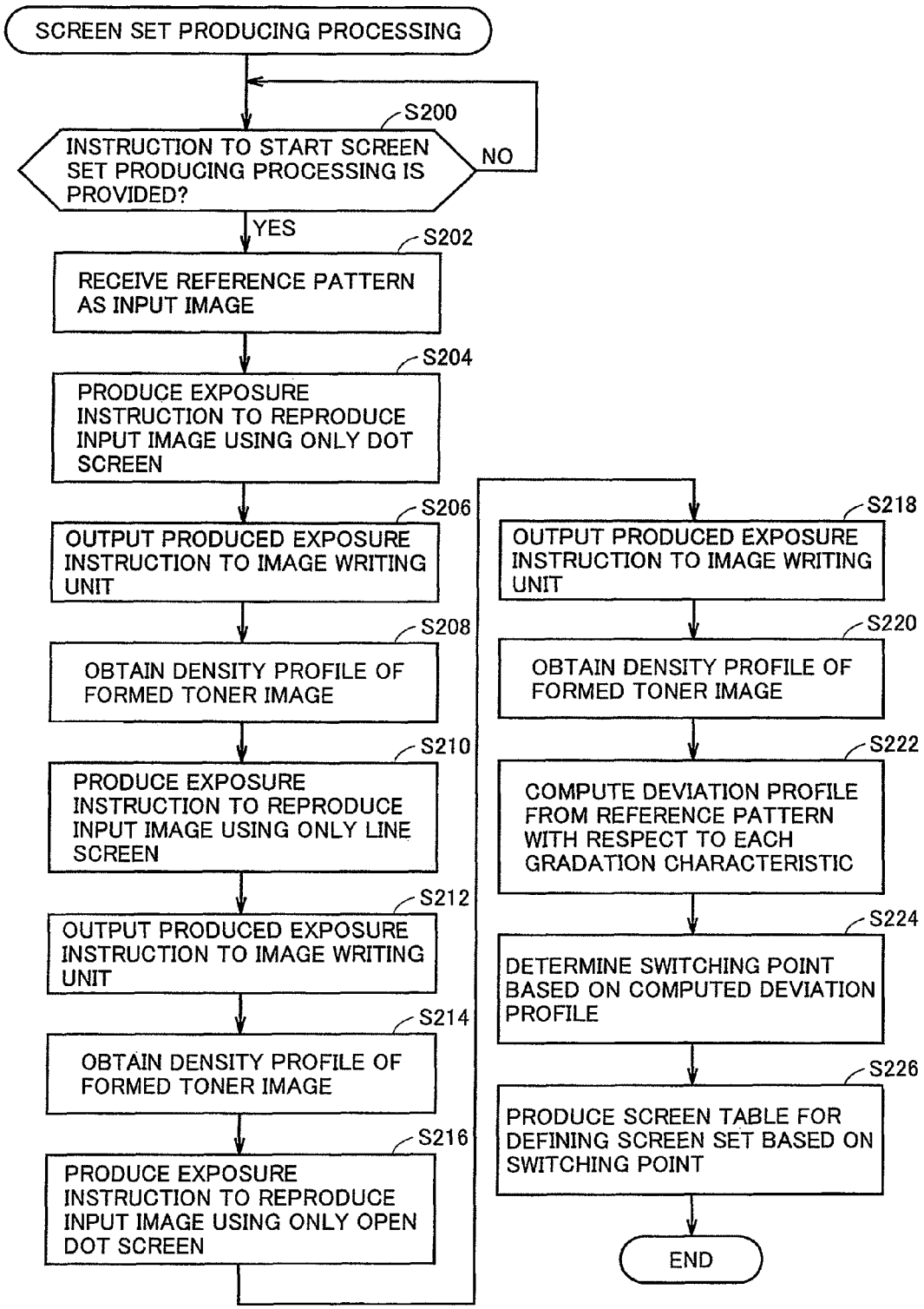
FIG. 28 is a flowchart illustrating a screen set producing procedure in the image forming apparatus according to an embodiment of the invention.

FIG. 27 is a flowchart illustrating an image forming processing procedure in image forming apparatus MFP according to the embodiment of the invention. FIG. 28 is a flowchart illustrating a screen set producing procedure in image forming apparatus MFP according to the embodiment of the invention. These flowcharts are typically provided such that CPU 102 (see FIG. 11) of controller 10 reads and executes the previously-stored program.

Referring to FIG. 27, CPU 102 determines whether the instruction to start the image forming processing is provided (Step S100). When the instruction to start the image forming processing is not provided (NO in Step S100), CPU 102 repeats the processing in Step S100.

When the instruction to start the image forming processing is provided (YES in Step S100), CPU 102 receives the input image (Step S102). Specifically, CPU 102 provides the control instruction to scanner 3 (see FIG. 1) to scan the document. Alternatively, CPU 102 reads the image data specified by HDD 110.

CPU 102 performs the pre-processing to the received input image (Step S104), and CPU 102 separates the input image after the pre-processing into the character region and the image region (Step S106). Then CPU 102 performs necessary processing to the character region separated in Step S106 (Step S108).

Concurrently, CPU 102 determines the gradation value to be reproduced in each predetermined unit region with respect to the image region separated in Step S106 (Step S110), and CPU 102 selects the screen to be used in each unit region based on the determination result (Step S112). CPU 102 extracts a set of adjacent unit regions in which the different types of the screens are selected (Step S114), and CPU 102 further extracts the set of adjacent unit regions in which the width of the gap portion located between the unit regions is smaller than a predetermined width with respect to the extracted sets of the adjacent unit regions (Step S116). CPU 102 corrects the pattern for the adhesion region that is included in the set of adjacent unit regions extracted in Step S116 (Step S118).

Finally, CPU 102 produces the exposure instruction corresponding to the input image based on the processing result output in Step S108, the screen selected in Step S112, and the pattern correction result in Step S118 (Step S120), and CPU 102 outputs the produced exposure instruction to image writing unit 43 (Step S122). Therefore, print engine 4 performs the image forming processing based on the exposure instruction. Then the processing is ended.

Referring to FIG. 28, the screen set producing processing used in image forming apparatus MFP according to the embodiment will be described below.

CPU 102 determines whether the instruction to start the screen set producing processing is provided (Step S200). When the instruction to start the screen set producing processing is not provided (NO in Step S200), CPU 102 repeats the processing in Step S200.

When the instruction to start the screen set producing processing is provided (YES in Step S200), CPU 102 receives the reference pattern having the predetermined gradation change as the input image (Step S202). CPU 102 produces the exposure instruction to reproduce the received input image using only the dot screen included in screen group 172 (Step S204), and CPU 102 outputs the produced exposure instruction to image writing unit 43 (Step S206). Therefore, print engine 4 performs the image forming processing based on the exposure instruction. CPU 102 obtains the density profile of the toner image formed in print engine 4 from IDC sensor 49 (Step S208). That is, CPU 102 obtains the gradation characteristic for the dot screen.

CPU 102 produces the exposure instruction to reproduce the received input image using only the line screen included in screen group 172 (Step S210), and CPU 102 outputs the produced exposure instruction to image writing unit 43 (Step S212). Therefore, print engine 4 performs the image forming processing based on the exposure instruction. CPU 102 obtains the density profile of the toner image formed in print engine 4 from IDC sensor 49 (Step S214). That is, CPU 102 obtains the gradation characteristic for the line screen.

CPU 102 produces the exposure instruction to reproduce the received input image using only the open dot screen included in screen group 172 (Step S216), and CPU 102 outputs the produced exposure instruction to image writing unit 43 (Step S218). Therefore, print engine 4 performs the image forming processing based on the exposure instruction. CPU 102 obtains the density profile of the toner image formed in print engine 4 from IDC sensor 49 (Step S220). That is, CPU 102 obtains the gradation characteristic for the open dot screen.

CPU 102 computes the deviation profile from the reference pattern with respect to the gradation characteristics obtained in Steps S208, S214, and S220 (Step S222), and CPU 102 determines the switching point based on the computed deviation profiles (Step S224). CPU 102 extracts necessary contents in the definition contents of screen tables 181, 182, and 183 (see FIGS. 20A to 20F) based on the switching point determined in Step S224 and produces screen table 184 for defining the screen set (Step S226). Then the processing is ended.

Advantage

According to the embodiment of the invention, the intermediate gradation is reproduced using the screen set in which such the pattern that the reproducibility is degraded in the electrophotography is avoided. For example, the pattern includes the pattern having the narrow width to which the toner adheres and the pattern having the narrow width to which the toner does not adhere. Therefore, the intermediate gradation can stably be reproduced. At the same time, the screen set is configured by selectively combining the screens in which the process is stabilized from the plural types of the screens according to the gradation value to be reproduced. Therefore, the granularity can be improved in the print result.

According to the embodiment of the invention, the screen set is dynamically produced and/or updated according to the density detection result of the actually-formed toner image and/or the image producing conditions such as the usage environment, use frequency, degradation state, and process setting condition of image forming apparatus MFP, so that the stable intermediate gradation reproducing processing can be achieved even if the process variation is generated by various factors.

According to the embodiment of the invention, the generation of the image noise such as the pseudo-contour can be suppressed even if the regions adjacent to each other in the toner image are formed according to the different types of the patterns like the case in which the continuous gradation change is included in the input image. Therefore, the high-quality output print can be obtained.

In the embodiment, the processing example is described in the monochrome image forming processing by way of example. The generation of the pseudo-contour can be suppressed by the similar processing in full-color image forming processing.

[Other Embodiments]

In the configuration of the embodiment of the invention, the necessary density change is generated by sequentially switching the three screens (the dot screen, the line screen, and the open dot screen) by way of example. Alternatively, the necessary density change may be generated by sequentially switching the two screens. Typically, the dot screen may be used for the portion (low gradation value) having the low density to be reproduced and the portion (high gradation value) having the high density to be reproduced while the line screen may be used for other portions having the intermediate density (intermediate gradation).

Figure 29:
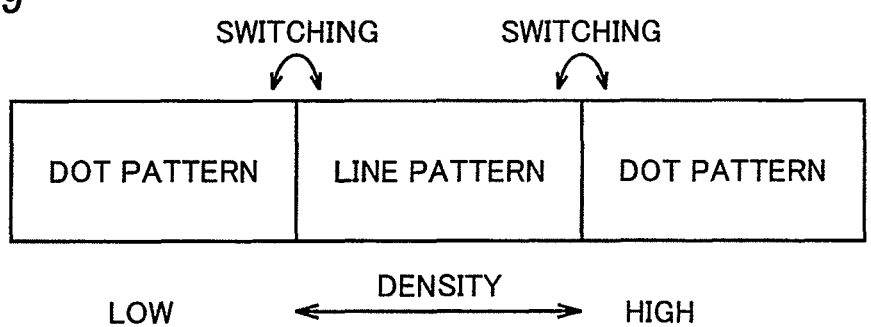
FIG. 29 is a view illustrating a screen switching pattern according to another embodiment of the invention.

As illustrated in FIGS. 18A to 18F, in the region having the relatively low area ratio and the region having the relatively high area ratio, the gradation characteristic of the dot screen is smaller than the gradation characteristic of the line screen in the deviation from the reference pattern. On the other hand, in the region having the intermediate area ratio, the gradation characteristic of the line screen is smaller than the gradation characteristic of the dot screen in the deviation from the reference pattern. Therefore, as illustrated in FIG. 29, preferably the screen is switched in the order of dot screen→line screen→dot screen in association with the change in density to be reproduced from the low value to the high value.

Alternatively, the screen set may be produced using the line screen and the open dot screen. Alternatively, the screen set may be produced using the dot screen and the open dot screen.

Part of or all the functions implemented by the program of the embodiment may be configured by dedicated hardware.

In the program executed by the CPU according to the embodiment, a necessary module of program modules provided as part of an Operating System (OS) of the computer may be called and processed in a predetermined array in predetermined timing. In such cases, the module is not included in the program, and the processing is performed in conjunction with the OS. Accordingly, the program that does not include the module should also be included in the invention. Although the present invention has been described and illustrated in detail, it is clearly understood that the same is by way of illustration and example only and is not to be taken by way of limitation, the scope of the present invention being interpreted by the terms of the appended claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electrophotographic image forming apparatus that selects a screen from a plurality of screens corresponding to a plurality of gradation values to form a toner image on media, each of the plurality of screens including a pattern in which a first region and a second region are defined, the first region including a pixel that is a toner adhesion control target, the second region including a pixel that is not the toner adhesion control target, comprising:
   a storage unit for storing a first screen group and a second screen group, the first region expanding with increasing gradation value based on a first rule in the first screen group, the first region expanding with increasing gradation value based on an independent second rule different from the first rule in the second screen group;
   a screen selector for selecting the screen from the first screen group when the gradation value is smaller than a first threshold with respect to a unit region of an input image and selecting the screen from the second screen group when the gradation value is larger than the first threshold; and
   an image producing unit for performing image formation using the selected screen,
   wherein the screen selector relocates a first portion and a second portion such that the first portion and the second portion are joined by the second region that is not the toner adhesion control target, the first portion including the screen included in the first screen group, the second portion including the screen included in the second screen group, when the first portion and the second portion are adjacent to each other as a result of the selection of the screen in each unit region of the input image.

2. The image forming apparatus according to claim 1, wherein the first screen group includes a pattern having a gradation value that is relatively larger than that of a pattern included the second screen group to have an identical area ratio, the area ratio being a ratio of an area occupied by the first region in the unit region, when the area ratio is relatively low.

3. The image forming apparatus according to claim 1, wherein
   the first screen group includes a dot pattern, and
   the second screen group includes a line pattern.

4. The image forming apparatus according to claim 1, wherein the second region is relocated so as to have a predetermined width in a joining portion that joins the first portion and the second portion.

5. The image forming apparatus according to claim 4, wherein
   the screen of the first screen group constituting the first portion is a dot pattern, and
   the predetermined width is an interval between dots near the joining portion that joins the first portion and the second portion.

6. The image forming apparatus according to claim 1, wherein the screen selector is operative to relocate the first region while maintaining an area of the first region in the unit region.

7. The image forming apparatus according to claim 1, wherein the screen selector is operative to relocate the first portion and the second portion such that the first portion and the second portion are joined by the second region when a parallel component does not exist in a gradation-change direction and a screen-angle direction of the screen constituting the first portion and the second portion.

8. The image forming apparatus according to claim 1, wherein the first rule includes expansion of a dot diameter or an increase in the number of dots with increasing gradation value, and
   the second rule includes expansion of a line width or an increase in the number of disposed lines with increasing gradation value.

9. The image forming apparatus according to claim 1, wherein
the storage unit in which a third screen group is further stored, the second region decreasing with decreasing gradation value based on an independent third rule different from the first and second rules in the third screen group, and
the screen selector is operative to select the screen from the third screen group when the gradation value is larger than a second threshold that is larger than the first threshold with respect to the unit region of the input image.

10. The image forming apparatus according to claim 9, wherein the third screen group includes an open dot pattern.

11. The image forming apparatus according to claim 10, wherein
the screen selector relocates the first portion and the second portion such that the first portion and the second portion are joined by the second region when the first portion includes the screen having the dot pattern while the second portion includes the screen having the line pattern, and
the screen selector does not relocate the first portion and the second portion such that the first portion and the second portion are joined by the second region when the first portion includes the screen having the line pattern while the second portion includes the screen having the open dot pattern.

12. The image forming apparatus according to claim 1, wherein each screen constituting the plurality of screens includes a pattern having a common screen angle and the common number of screen lines.

13. The image forming apparatus according to claim 1, wherein an area ratio of the second screen group is larger than that of the first screen group at a gradation value of the first threshold with respect to the area ratio that is of a ratio of an area occupied by the first region in the unit region.

14. The image forming apparatus according to claim 1, further comprising:
a density sensor for detecting density as a result of image formation of the image producing unit; and
a producing unit for producing or updating the plurality of screens based on detection result of the density sensor.

15. The image forming apparatus according to claim 14, wherein
the producing unit is operative to
obtain a gradation characteristic of the first screen group from the result of the density sensor that detects the image formation result with each screen included in the first screen group according to a reference pattern having a plurality of different gradation values,
obtain a gradation characteristic of the second screen group from the result of the density sensor that detects the image formation result with each screen included in the second screen group according to the reference pattern, and
determine the first threshold such that an error of a gradation characteristic corresponding to the reference pattern is reduced based on the gradation characteristics of the first and second screen groups.

16. The image forming apparatus according to claim 1, further comprising an update unit for updating the plurality of screens stored in the storage unit according to an image producing condition of the image forming apparatus.

17. An electrophotographic image forming apparatus that selects a screen from a plurality of screens corresponding to a plurality of gradation values to form a toner image on media, comprising:
a storage unit in which a first screen group and a second screen group are stored, the first screen group including a plurality of screens having a first pattern, the first pattern defining a first region including a pixel that is a toner adhesion control target, the second screen group including a plurality of screens having a second pattern, the second pattern defining a second region including a pixel that is not the toner adhesion control target;
a screen selector for selecting the screen from the first screen group such that the first region expands in a predetermined direction with increasing gradation value, switching the selected screen from the first screen group to the second screen group when the gradation value reaches a predetermined threshold, and selecting the screen, in which a width of the second region in the second pattern is larger than a distance between the adjacent first regions in the first pattern in the predetermined direction, as the screen during switching; and
an image producing unit for performing image formation using the selected screen,
wherein the screen selector relocates a first portion and a second portion such that the first portion and the second portion are joined by the second region that is not the toner adhesion control target, the first portion including the screen included in the first screen group, the second portion including the screen included in the second screen group, when the first portion and the second portion are adjacent to each other as a result of the selection of the screen in each unit region of the input image.

18. The image forming apparatus according to claim 17, wherein the screen selected from the first screen group and the screen selected from the second screen group have a substantially identical gradation value before and after the switching.

19. The image forming apparatus according to claim 17, wherein the screen selector performs relocation, in which the pixel of the toner adhesion control target in the first region is replaced with the pixel that is not the toner adhesion control target in the second region, while the identical gradation value is maintained before and after the switching.

20. The image forming apparatus according to claim 17, wherein the first screen group includes a dot pattern, and
the second screen group includes a line pattern.

21. The image forming apparatus according to claim 17, wherein the second region is relocated so as to have a predetermined width in a joining portion that joins the first portion and the second portion.

22. The image forming apparatus according to claim 21, wherein
the screen of the first screen group constituting the first portion is a dot pattern, and
the predetermined width is an interval between dots near the joining portion that joins the first portion and the second portion.

23. The image forming apparatus according to claim 17, wherein the screen selector is operative to relocate the first region while maintaining an area of the first region in the unit region.

24. An electrophotographic image forming apparatus that selects a screen from a plurality of screens corresponding to a plurality of gradation values to form a toner image on media, comprising:
a storage unit in which a first screen group and a second screen group are stored, the first screen group including a plurality of screens having a first pattern, the first pattern defining a first region including a pixel that is a toner adhesion control target, the second screen group including a plurality of screens having a second pattern, the second pattern defining a second region including a pixel that is not the toner adhesion control target;

a screen selector for selecting the screen from the second screen group such that the second region expands in a predetermined direction with decreasing gradation value, switching the selected screen from the second screen group to the first screen group when the gradation value reaches a predetermined threshold, and selecting the screen, in which a distance between the adjacent first regions in the first pattern is smaller than a width of the second region in the second pattern in the predetermined direction, as the screen during switching; and an image producing unit for performing image formation using the selected screen, wherein the screen selector relocates a first portion and a second portion such that the first portion and the second portion are joined by the second region that is not the toner adhesion control target, the first portion including the screen included in the first screen group, the second portion including the screen included in the second screen group, when the first portion and the second portion are adjacent to each other as a result of the selection of the screen in each unit region of the input image.

25. The image forming apparatus according to claim 24, wherein the screen selected from the first screen group and the screen selected from the second screen group have a substantially identical gradation value before and after the switching.

26. The image forming apparatus according to claim 24, wherein the screen selector performs relocation, in which the pixel of the toner adhesion control target in the first region is replaced with the pixel that is not the toner adhesion control target in the second region, while the identical gradation value is maintained before and after the switching.

27. The image forming apparatus according to claim 24, wherein
the first screen group includes a dot pattern, and
the second screen group includes a line pattern.

28. The image forming apparatus according to claim 24, wherein the second region is relocated so as to have a predetermined width in a joining portion that joins the first portion and the second portion.

29. The image forming apparatus according to claim 28, wherein
the screen of the first screen group constituting the first portion is a dot pattern, and
the predetermined width is an interval between dots near the joining portion that joins the first portion and the second portion.

30. The image forming apparatus according to claim 24, wherein the screen selector is operative to relocate the first region while maintaining an area of the first region in the unit region.

* * * * *